United States Patent
Files et al.

(10) Patent No.: US 10,849,320 B2
(45) Date of Patent: Dec. 1, 2020

(54) PEST TRAP WITH DISPOSAL CONTAINER AND WIRELESS MONITORING

(71) Applicants: Jace W. Files, Round Rock, TX (US); John Trevor Morrison, Round Rock, TX (US); Shivshanker Somashekar Naimpally, Austin, TX (US)

(72) Inventors: Jace W. Files, Round Rock, TX (US); John Trevor Morrison, Round Rock, TX (US); Shivshanker Somashekar Naimpally, Austin, TX (US)

(*) Notice: Subject to any disclaimer, the term of this patent is extended or adjusted under 35 U.S.C. 154(b) by 0 days.

(21) Appl. No.: 16/271,488

(22) Filed: Feb. 8, 2019

(65) Prior Publication Data
US 2020/0253186 A1    Aug. 13, 2020

(51) Int. Cl.
| | | |
|---|---|---|
| *A01M 23/38* | (2006.01) |
| *A01M 19/00* | (2006.01) |
| *A01M 23/18* | (2006.01) |
| *A01M 99/00* | (2006.01) |

(52) U.S. Cl.
CPC ............ *A01M 23/38* (2013.01); *A01M 19/00* (2013.01); *A01M 23/18* (2013.01); *A01M 99/00* (2013.01)

(58) Field of Classification Search
CPC ...... A01M 12/38; A01M 23/18; A01M 23/00; A01M 23/16; A01M 19/00; A01M 99/00
See application file for complete search history.

(56) References Cited

U.S. PATENT DOCUMENTS

| | | | | | |
|---|---|---|---|---|---|
| 4,214,399 | A | * | 7/1980 | Bradley | A01M 23/08 43/66 |
| 4,578,892 | A | * | 4/1986 | Melton | A01M 23/18 43/58 |
| 5,148,625 | A | * | 9/1992 | Saleman | A01M 23/18 43/107 |
| 5,327,673 | A | * | 7/1994 | Paglia | A01M 23/18 43/61 |
| 6,836,999 | B2 | * | 1/2005 | Rich | A01M 19/00 43/98 |
| 2010/0134301 | A1 | * | 6/2010 | Borth | G08C 17/02 340/573.2 |
| 2018/0325092 | A1 | * | 11/2018 | Round | A01M 23/12 |
| 2019/0029244 | A1 | * | 1/2019 | Steele | A01M 1/06 |
| 2019/0037829 | A1 | * | 2/2019 | Laut | G01R 33/093 |
| 2019/0166823 | A1 | * | 6/2019 | Dick | A01M 23/38 |
| 2019/0246621 | A1 | * | 8/2019 | Kletzli | A01M 31/002 |
| 2020/0005626 | A1 | * | 1/2020 | Triventi | G08B 25/009 |

* cited by examiner

*Primary Examiner* — Christopher R Harmon
(74) *Attorney, Agent, or Firm* — Shiv S. Naimpally

(57) ABSTRACT

In some implementations, a trap to capture and kill a pest may include a circuit. The circuit may receive sensor data from a sensor and determine that a pest has entered the trap. The circuit may cause a shutter inside the trap to move from an approximately horizontal position to an approximately vertical position, thereby causing a portion of a door of a container located inside the trap to come in contact with adhesive on an outer surface of the container to prevent the pest from leaving the container. Substantially simultaneously with the shutter moving, the circuit may provide electricity to two conductive plates located on in a inner bottom surface of the container, thereby causing the electricity to pass through the pest. The circuit may send a wireless notification message, indicating that the pest was captured in the container, over a wireless network to a computing device.

20 Claims, 11 Drawing Sheets

PEST TRAP WITH DISPOSAL CONTAINER AND WIRELESS MONITORING

BACKGROUND OF THE INVENTION

Field of the Invention

The invention relates to pest traps and more particularly to a pest trap that can be wirelessly monitored and that includes a disposal container.

Description of the Related Art

Pest control has remained largely unchanged for many years. Modern pest control is low-tech, with glue traps or mechanical traps that are manually baited with peanut butter or similar attractants. Once traps are set, a user (e.g., either a homeowner or a pest control service) must manually examine each trap to avoid having a trapped pest slowly die and decay over time and to re-bait each trap as needed. In addition, disposal of the decaying body of a pest stuck to a glue trap is usually an unpleasant experience.

SUMMARY OF THE INVENTION

In some implementations, a trap to capture and kill a pest may include a circuit. The circuit may receive sensor data from a sensor and determine that a pest has entered the trap. The circuit may cause a shutter inside the trap to move from an approximately horizontal position to an approximately vertical position, thereby causing a portion of a door of a container located inside the trap to come in contact with adhesive on an outer surface of the container to prevent the pest from leaving the container. Substantially simultaneously with the shutter moving, the circuit may provide electricity to two conductive plates located on in a inner bottom surface of the container, thereby causing the electricity to pass through the pest. The circuit may send a wireless notification message, indicating that the pest was captured in the container, over a wireless network to a computing device.

DETAILED DESCRIPTION

Figure 1:
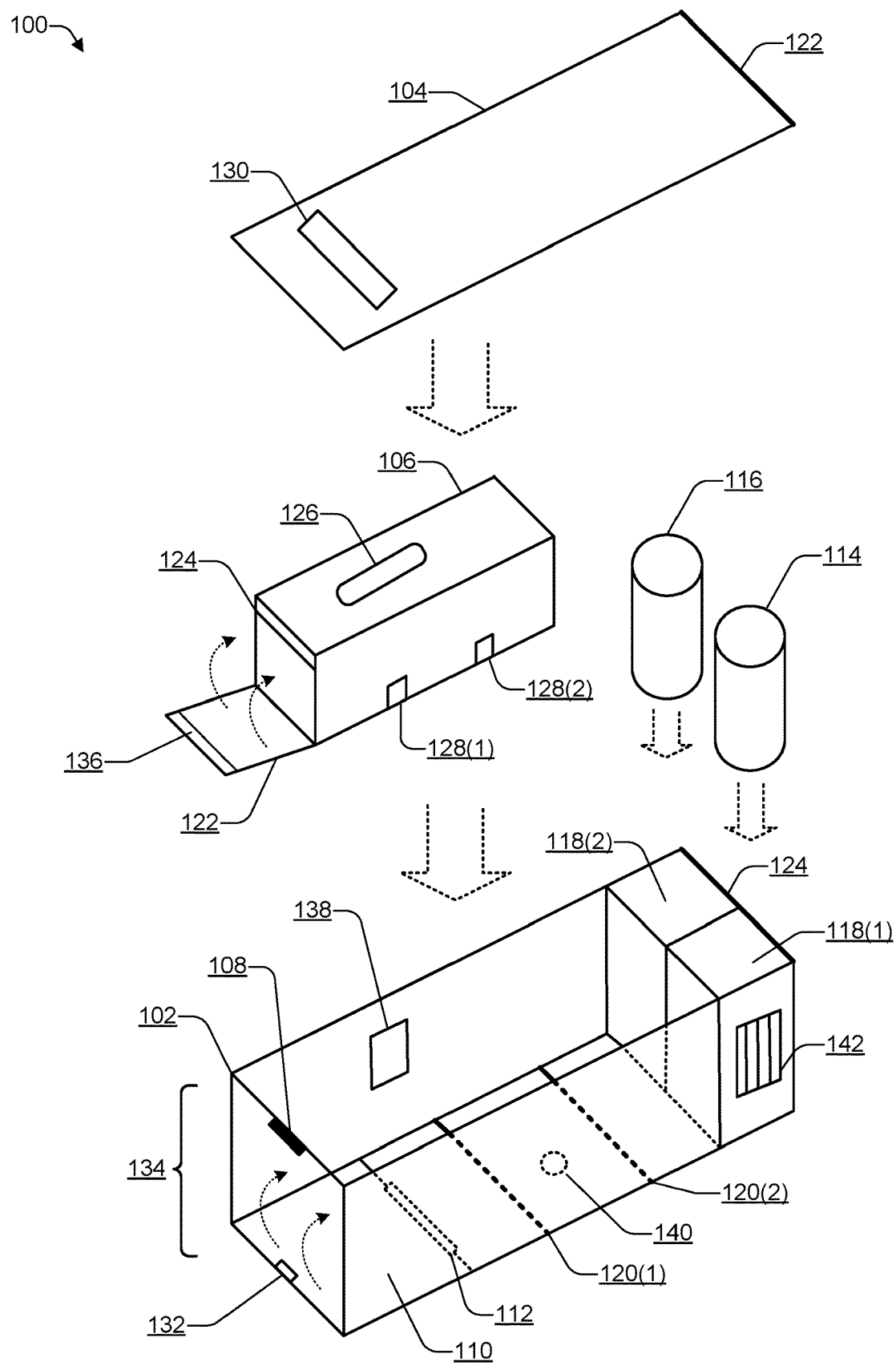
FIG. 1 is a block diagram illustrating a trap with a hinged or removeable lid, according to some embodiments.

The systems and techniques herein describe a pest trap ("trap") that can detect when a pest has been killed and, in response, send an alert to a computing device associated with a homeowner or a pest control service. The trap may include a container (e.g., paper, treated paper, plastic, or the like) to hold the dead pest and to enable the dead pest to be hygienically disposed. The trap may include one or more sensors, such as, for example, a motion sensor, an imaging sensor (e.g., a camera), an audio transducer (e.g., microphone), a structured light sensor, an ultrasound sensor, an infrared imaging sensor, a temperature (e.g., a thermistor) sensor, an ultrasonic sensor, a capacitive sensor, a micropower impulse radar sensor, a global positioning satellite (GPS) sensor, an altimeter (e.g., to detect which floor of a building the trap has been placed, based on altitude), mmWave, and the like. Structured light involves projecting a known pattern (e.g., a grid or horizontal bars) of light on to an area (e.g., detection zone). The way in which the light deforms when striking the area enables a vision system (e.g., imaging sensor(s) and software) to determine the depth and surface information associated with a pest in the area. An mmWave sensor is able to detect objects (e.g., pests) and provide a range, a velocity, and an angle of each of the objects. An mmWave sensor operates in the spectrum between 30 GHz and 300 GHz. At least one sensor may be inward facing to detect when a pest has been captured in the container. In some cases, one or more additional sensors may be outward facing to enable the trap to detect pest activity in an area in which the trap is located.

The additional sensors may monitor a particular area (e.g., detection zone). When a sensor (e.g., motion trap, infrared imaging sensor, or the like) detects motion associated with a potential pest in the detection zone, sensor data, such as an image of the potential pest, may be captured. For example, an ambient light sensor (ALS) may detect an amount of light. If the ALS detects that the amount of available light satisfies a light threshold, then an imaging sensor may be used to capture a digital image (or a set of digital images=a video) of the potential pest. If the ALS detects that the amount of available light does not satisfy the light threshold, then either an infrared imaging sensor may be used to capture a digital image of the potential pest or a light emitting diode (LED) may be used as a flash to briefly illuminate the potential pest to enable an imaging sensor to capture a digital image.

The ALS may be used to transition the trap to and from a low power mode. For example, many pests tend to be active during darkness. Thus, the trap may be in a detection mode when the light measured by the ALS satisfies a light threshold (or the presence of a human is detected). The trap may transition from the detection mode to a low power mode when the ALS determines that the light does not satisfy the light threshold (or a presence of a human is not detected for more than a threshold amount of time). When the ALS determines that the light satisfies the threshold (or detects the presence of a human), the trap may transition from the low power mode to the detection mode. For example, if the trap is powered using a battery, then transitioning to the low power mode may conserve battery power and enable the trap to function for a longer time using one or more batteries as compared to if the low power mode was not used. Traps that draw power from an electrical outlet (e.g., alternating current (A/C)) may, in some cases, not use the low power mode. The low power mode may be a user selectable option such that a user can select to disable low power mode, thereby causing the trap to remain in detection mode.

The trap may be available in different models, such as a battery powered model and an A/C powered model. Some models may include a weather sealed model (e.g., that uses gaskets) to prevent moisture and particulate matter from entering into a housing of the trap to enable the trap to be used outdoors to capture outdoor pests (e.g., rabbits, squirrels, racoons, snakes, wasps, and the like). The trap models may include a modular model that enables sensor modules to be attached to (and detached from) the housing of the trap.

Each trap may include one or more external indicator lights (e.g., on a front faceplate) to visually indicate a mode (e.g., detection mode or low-power mode), network connectivity (e.g., connected to or disconnected from network), pest capture (e.g., green indicates trap is active, red indicates a pest was captured), and other information associated with the trap.

Each trap may include a wireless network interface (e.g., WiFi®, Bluetooth®, or the like) to enable the trap to communicate with (i) other traps (e.g., to create a mesh network), (ii) an application ("app") executing on a user's computing device, (iv) a cloud-based server, (iii) a pest services company, or any combination thereof. For example, the trap may create a mesh network with other traps using a short distance networking protocol, such as, for example, Bluetooth®, ZigBee, or the like. As another example, the trap may communicate with other traps, one or more user devices, a server, or other devices using WiFi® or another type of wireless networking technology. The trap may communicate data to an application executing on a user device, such as a smartphone, a tablet, or a virtual assistant enabled device (e.g., Amazon® Echo® or Alexa®, Google® Home, Apple® Homepod, or the like).

A software application ("app") may be downloaded and installed on a user device, such as a computing device associated with an occupant of a home, a warehouse staff member, a pest control service, or the like. The app may display a user interface (UI) to display data received from multiple traps in a particular location, such as a house, a warehouse, an industrial plant, or another type of building or set of buildings. For example, the UI may display an approximate floor plan of the particular location and an approximate location of each trap within the floor plan. The UI may display data associated with each trap, such as a mode (e.g., detection mode or low-power mode), network connectivity (e.g., connected to or disconnected from a network), whether or not the trap has captured a pest (e.g., green indicates trap is active, red indicates that a pest has been captured), and other information associated with the trap. The UI may enable a user to view the data gathered by each trap, such as a digital image of the pest that was captured in the trap.

In some cases, a pest control service provider may rent multiple traps to homeowners or commercial users while providing pest control services (e.g., removing a captured pest from each trap and resetting each trap) to the location in which the traps are deployed. For example, the pest control service provider may place one or more traps in a home and remotely (e.g., via wireless networking) monitor a status of each of the traps. When a trap captures and kills (e.g., electrocutes) a pest, the trap may send a wireless notification message to the service provider. The service provider may send a representative to dispose of the captured pest and reset the trap by placing a new container in the trap and resetting the detection circuit and indicator light.

As an example, a trap to capture and kill (by electrocution) a pest may include one or more sensors, including an inward facing sensor. In some cases, the one or more sensors may include at least one of: a motion sensor, an imaging sensor, a microphone, a structured light sensor, an ultrasound sensor, a temperature sensor, an ultrasonic sensor, a capacitive sensor, or a micropower impulse radar sensor. The trap may include one or more plastic components. The trap may include a first power rail and a second power rail located on an inner bottom surface of the trap and running along a width of the trap. A container may be placed inside the trap. The container may include treated paper, such as, for example, paper treated with a coating such as wax or plastic. The container may include a first conductive plate and a second conductive plate located on an inner bottom surface of the container. The first conductive plate may be connected to a first contact running along an exterior width of the container. The second conductive plate may be connected to a second contact running along the exterior width of the container. The trap may include one or more processors and one or more non-transitory computer readable media storing instructions executable by the one or more processors to perform various operations. For example, the operations may include receiving sensor data from the inward facing sensor, determining that the sensor data indicates a presence of a pest in the trap, and causing a shutter inside the trap to move from an approximately horizontal position to an approximately vertical position. As a first example, causing the shutter inside the trap to move from the approximately horizontal position to the approximately vertical position may include releasing a latch, causing a spring mechanism in a shutter hinge attached to the shutter to contract. As a second example, causing the shutter inside the trap to move from the approximately horizontal position to the approximately vertical position may include providing the electricity to a motor located in a shutter hinge attached to the shutter, causing the motor to move the shutter at the shutter hinge. The movement of the shutter from the approximately horizontal position to the approximately vertical position may cause a portion of a door of the container to come in contact with adhesive on an outer surface of the container to prevent the pest from leaving the container. Substantially at the same time as the shutter is moving from the approximately horizontal position to the approximately vertical position, the operations may include providing electricity (e.g., power) to the first rail and the second rail. The first rail may be touching the first contact of the container that is connected to the first conductive plate and the second rail may be touching the second contact of the container that is connected to the second conductive plate, resulting in the electricity passing from the first conductive plate, through the pest, to the second conductive plate. A voltage and an amperage of the electricity may be sufficient to electrocute a pest (e.g., a mouse, a rat, or the like) that can fit into the container. The operations may include sending a notification message over a wireless network to a computing device. The notification message may indicate that the pest was captured in the container. The notification message may notify a user that the container is to be removed from the trap and replaced with a new container.

FIG. 1 is a block diagram illustrating a trap 100 with a hinged or removeable lid, according to some embodiments. The trap 100 may include a housing 102 and a lid 104, both made out of plastic. In some cases, the lid 104 may be removeable, as illustrated in FIG. 1, to enable a container 106 to be placed in the housing 102 and to enable the container 106 to be removed from the housing 102 after a pest has been captured in the container 106. In other cases, the lid 104 may be hinged. For example, an edge 122 of the lid 104 may be connected to the housing 102 via a hinge 124 to enable the lid 104 to be lifted open to enable the container 106 to be removed from the housing 102 after a pest has been captured in the container 106. The pest may be a mouse, a rat, a squirrel, or another type of rodent. In some cases, the size of the components of the trap 100 may be scaled according to an average size of the type of pest being targeted. For example, a small version of the trap 100 may be used for mice and other smaller pests, a medium size version of the trap 100 may be used for rats and other medium-sized pests, and a large version of the trap 100 may be used for squirrels and other large-sized pests. In some cases, the housing 102 may have a length (L) of between about 280 to 320 millimeters (mm), a height (H) of between about 50 to 70 mm, and a width (W) of about 90 to 110 mm. For example, in an embodiment to catch a rat, the housing 102 may have dimensions of approximately 287 mm (L)×60 mm (H)×97 mm (W). The container 106 may have dimensions of approximately 167 mm (L)×47 mm (H)×50 mm (W). As another example, in an embodiment to catch a mouse, the housing 102 may have dimensions of approximately 167 mm (L)×47 mm (H)×50 mm (W).

The housing 102 may include one or more sensors 108, a shutter 110 attached to the housing 102 using a shutter hinge 112. The sensors 108 may include at least one inward facing sensor. In some cases, the sensors 108 may include one or more outward facing sensors in addition to the inward facing sensor. The inward facing sensor of the sensors 108 may detect when a pest has entered into the housing 102, when the shutter 110 moves from an approximately horizontal position (e.g., the trap 100 is armed) to an approximately vertical position (e.g., the trap 100 has been sprung and has captured a pest), or both. Bait 114 and at least one battery 116 may be placed in receptacles 118(1) and 118(2), respectively, in the housing 102. While the receptacles 118 are shown in FIG. 1 as being located at one end of the housing 102, in some cases, the receptacles 118 may be located elsewhere in the housing 102, such as one side of the housing 102. While a single battery 116 is illustrated, the battery 116 may be a battery holder that is capable of holding multiple battery cells, such as multiple nine-volt batteries, multiple 1.5 volt batteries (e.g., AAA, AA, or CC size), rechargeable batteries, multiple other sized batteries, or the like.

In some cases, the bait 114 may be a liquid attractant, such as an oil infused with a scent that a particular type of pest (e.g., mouse, rat, or the like) finds attractive (e.g., a food source). A diffuser (e.g., an ultrasonic or a heat-based diffuser) in the housing 102 may spread the smell of the bait 114 in the atmosphere. For example, the bait 114 may be a glass or plastic bottle with a wick. In other cases, the bait 114 may be small plastic pellets or balls infused with (e.g., filled with or coated with) an attractant. In still other cases, the bait 114 may be a liquid attractant infused membrane (e.g., permeable membrane). The membrane may enable the liquid attractant to evaporate at a controlled rate. The membrane may (1) enable a small amount of the liquid attractant to flow in the membrane pores for evaporation at the surface and (2) prevent the liquid attractant from spilling. The bait 114 may have a mechanism that enables an approximate amount of bait that has been deployed, an approximate amount of remaining bait, or both to be determined and displayed using an indicator. Alternately, the circuit 138 may determine (e.g., based on a temperature and a humidity of the surrounding area) an evaporation rate of the attractant in the bait 114 and determine approximately how long the bait 114 will last. The temperature and humidity may be determined based on sensor data received from the sensors 108 (e.g., a temperature sensor, a humidify sensor, and the like). When the circuit 138 determines that the bait 114 is to be replaced (e.g., based on the estimate as to how long the bait will last), the circuit 138 may (1) use an indicator light on an external surface of the trap 100 indicating that the bait 114 is to be replaced (e.g., change indicator from green to red), (2) send a wireless notification message to a user's computing device indicating that the bait 114 is to be replaced, or both.

The housing 102 may include one or more rails 120, such as the rail 120(1) and the rail 120(2). A voltage with a particular amount of amperage may flow from one of the rails 120 to the other of the rails 120. For example, the voltage and amperage may be sufficient to electrocute a pest, such as a mouse, a rat, a squirrel, or another type of rodent. One of the rails 120 may carry power (e.g., voltage) while the other of the rails 120 may be a ground or a negative. Thus, a pest entering the housing 102 may complete a circuit, causing the power to flow between the rails 120 to electrocute the pest. In some cases, an area between the rail 120(1) and rail 120(2) may include a trough or one or more drain holes, such as a representative drain hole 140, to enable the ingress of a small amount of liquid (e.g., water) inside the housing 102 without causing the rails 120 to short-circuit. The trough may collect water and enable the water to evaporate. The drain hole(s) 140 may enable the water (or other liquid) to drain from the housing 102.

The container 106 may be made out of plastic, paper, treated paper, impregnated with wax, impregnated with another substance, or any combination thereof. The container 106 may include (e.g., may be impregnated with) wax (or a wax layer) to prevent liquids from the dead pest to leak out. The container 106 may be treated (e.g., coated or infused with) chemicals to make the container 106 flame retardant. For example, the flame retardant chemicals may include Tetrabromobisphenol-A (TBBPA), aluminium hydroxide (ATH), magnesium hydroxide (MDH), huntite, hydromagnesite, various hydrates, red phosphorus, boron compounds (e.g., borates), organochlorines (e.g., chlorendic acid derivatives and chlorinated paraffins), organobromines (e.g., decabromodiphenyl ether (decaBDE), decabromodiphenyl ethane, polymeric brominated compounds such as brominated polystyrenes, brominated carbonate oligomers (BCOs), brominated epoxy oligomers (BEOs), tetrabromophthalic anyhydride, tetrabromobisphenol, hexabromocyclododecane (HBCD), organophosphates (e.g., triphenyl phosphate (TPP), resorcinol bis(diphenylphosphate) (RDP), bisphenol A diphenyl phosphate (BADP), and tricresyl phosphate (TCP)), phosphonates (e.g., dimethyl methylphosphonate (DMMP)), and phosphinates (e.g., aluminium diethyl phosphinate). The container 106 may be shipped in a substantially flat form. The edges of the container 106 may be creased to enable the container 106 to be opened from the flat form into the form illustrated in FIG. 1. The container 106 may be "keyed" in such a way that the container 106 can only be placed in the housing 102 in one orientation, e.g., with the door 122 facing a front 134 of the housing 134. For example, a plastic column in the housing 102 may align with a groove in the container 106 to enable the container 106 to be placed in the housing 102 with the door 122 facing the front 134 while preventing the container 102 from being placed in the housing 102 with the door 122 facing away from the front 134. The container 106 may include a door 122 and a strip 124. The strip 124 may be an adhesive strip, Velcro, a magnetic strip, or a catch tab. For example, when the door 122 moves from an approximately horizontal position to an approximately vertical position, the top portion of the door 122 may come in contact with the strip 124, thereby preventing a pest that has entered the container 106 from escaping from the container 106. In the case of an adhesive strip 124, the strip 124 may adhere to the top 136 of the door 122. In the case of a Velcro strip 124, the strip 124 may be a hook (or loop) surface and may adhere to the top 136 which has a loop (or hook) surface. In the case of a catch tab strip 124, the strip 124 may catch a tab included in the top 136. The container 106 may include a container handle 126 to enable the container 106 to be placed in the housing 102 and removed from the housing 102 (e.g., after a pest has been captured in the container 106). The container 106 may include two (or more) contacts, such as a contact 128(1) and a contact 128(2). When the container 106 is placed in the housing 102, the contact 128(1) may touch the rail 120(1) and the contact 128(2) may touch the rail 120(2), thereby enabling a pest that enters into the container 106 to be killed by electrocution. The contacts 128 may connect to conductive plates located on an inner bottom surface of the container 106. For example, the contacts 128 and the conductive plates may be made out of aluminum foil or another type of conductive material. The container 106 may be capable of holding between at least 10 grams (g) to 40 g for trapping a mouse and may be capable of holding between at least 100 g to 700 grams for trapping a rat. When the door 122 is closed, causing a top 136 portion of the container 106 to come in contact with an strip 124 located at a top outer surface of the container 106, the container 106 may be capable of holding between at least 10 grams (g) to 40 g for trapping a mouse and may be capable of holding between at least 100 g to 700 grams for trapping a rat.

The housing 102 may include a vent 142 on one wall of the receptacle 118(1) for the bait 114. The vent 142 may enable a smell of the bait 114 to be diffused into the external environment to attract pests. In some cases, a small fan (e.g., a piezoelectric fan or other type of low power consumption fan with a noise of less than 30 decibels (db)) may be mounted behind the vent 142 (e.g., inside the receptacle 118(1)) or externally (e.g., outside the housing 102) to diffuse the smell of the bait 114 into the environment surrounding the housing 102.

The shutter hinge 112 may enable the shutter 110 to move approximately 90 degrees, e.g., from an approximately horizontal position to an approximately vertical position. The shutter hinge 112 may include a mechanical or an electro-mechanical mechanism to raise and lower the shutter 110. For example, the shutter hinge 112 may include a spring, a motor, or another type of mechanism. To illustrate, a spring may have tension and the shutter 110 may be held in the horizontal position by a latch 132. When an inward facing sensor of the sensors 108 detects that a pest has entered into the housing 102, the sensors 108 may cause the latch 132 to release, resulting in the shutter 110 moving from an approximately horizontal position (e.g., the trap 100 is armed) to an approximately vertical position (e.g., the trap 100 has been sprung and has captured a pest). The latch 132 may be electro-mechanical, magnetic, electro-magnetic, or the like. For example, the latch 132 may physically hold the shutter 110 in a horizontal position. When electricity is applied to the latch 132, the latch 132 may move to release the shutter 110, causing a spring mechanism (e.g., part of the shutter hinge 112) to pull the shutter 110 from the horizontal position to a vertical position. As another example, the latch 132 may be electromagnetic and, when electricity is applied, attract a metal plate on the shutter 110 to hold the shutter 110 in a horizontal position. When the electricity is stopped to the latch 132, the latch 132 may release the shutter 110, causing a spring mechanism (e.g., part of the shutter hinge 112) to pull the shutter 110 from the horizontal position to a vertical position. In some cases, the latch 132 may not be present. In such cases, the shutter 110 may be held in a horizontal position by gravity and when electricity is applied to a stepper motor (e.g., in the shutter hinge 112), the shutter 110 may move from the horizontal position to a vertical position.

To arm the trap 100, a user may lift the lid 104, e.g., using a lid handle 130, place (or ascertain) the shutter 110 in the horizontal position (e.g., substantially flush with a bottom surface of the housing 102), and place the container 106 into the housing 102. For example, to place the shutter 110 in the horizontal position, the user may push the shutter 110 down and secure the shutter 110 in the horizontal position with the latch 132. The housing 102 may include guides (e.g., inward facing columns) such that placing the container 106 in the housing 102 causes the contacts 128 to automatically make contact with the rails 120.

The user may check a battery indicator on the housing 102 to determine a battery level of the battery 116. For example, the battery indicator may be on a front panel of the housing 102, a back panel of the housing 102, adjacent to the battery receptacle 118(2), or located on another part of the housing 102. If the battery level is below a particular threshold, the user may replace the battery 116 with a new (e.g., fully charged) battery. For example, the battery indicator may be a multicolor light emitting diode (LED) or other indicator and may indicate green when the battery level is at least a first threshold voltage, indicate yellow when the battery level is less than the first threshold voltage but greater than or equal to a second threshold voltage, and indicate red when the battery level is below the second threshold voltage. The battery 116 may use zinc oxide, alkaline, or may be rechargeable (e.g., lithium ion, nickel cadmium, or the like). The user may check a bait level indicator on the housing 102 to determine an amount of remaining bait 114. For example, the bait level indicator may be on a front panel of the housing 102, a back panel of the housing 102, adjacent to the battery receptacle 118(2), or located on another part of the housing 102. If the bait level is below a particular threshold, the user may replace the bait 114 with new bait. A bait sensor may be located in the receptacle 118(1) to determine an approximate amount of the bait 114 that is remaining. For example, the bait sensor may use a weight of the bait 114, or initiate a countdown timer when the bait 114 is initially inserted into the receptacle 118(1) and estimate a remaining life of the bait 114 (e.g., based on temperature and humidity). In some cases, the bait 114 may be formulated with a conductive element (e.g., salt), enabling the bait sensor to measure a resistance of the bait 114 to determine a remaining amount of the bait 114 (e.g., and when to replace the bait 114 with new bait). The bait 114 may be any type of olfactory-based attractant, such as a liquid (e.g., oil) or a slow evaporation solid. The attractant may be infused with a scent that a particular type of pest finds attractive. For example, the scent may be that of a type of food (e.g., peanuts) that the pest finds attractive or that of a pheromone. The bait indicator may indicate green when the bait level is greater than or equal to a threshold amount and indicate red when the bait level is below the threshold amount, indicating to replace the bait 114.

Thus, the user may confirm that (or place) the shutter 110 in the horizontal position, confirm that (or replace) the battery 116 has sufficient energy to power the trap 100, and confirm that (or replace) the bait 114 has sufficient strength to attract pests. The user may place the container 106 in the housing 102 with each of the contacts 128 making contact with a respective one of the rails 120, place the lid 104 on top of the housing 102 and place the trap 100 in an area where pest activity has been observed or where the user suspects one or more pests are present. The container 106 may be placed in a way that two or more contacts 128 on the container 106 make contact with two or more corresponding power rails 120 carrying power in the housing 102. In some cases, e.g., when the bait 114 is in a liquid form (e.g., an oil that includes an attractant and where the oil is stored in a bottle), the housing 102 may include a diffuser to accelerate evaporation of the bait 114 into the area surrounding a location where the trap 100 is placed. At this point, the trap 100 is "armed" and ready to attract and electrocute a pest.

A pest attracted by the bait 114 may enter the trap 100 through an opening in a front 134 of the housing 102. A circuit 138 in the housing 102 may monitor the one or more of the sensors 108. The circuit 138 may be printed circuit board (PCB) with a logic device, embedded controller, or a processor configured with specific instructions to perform the various functions described herein. The circuit 138 may be located in a compartment within the housing 102. The circuit 138 may receive power from the battery 116 and be connected to the sensors 108, the shutter hinge 112, and the rails 120. When the circuit 138 determines that one of the sensors 108 (e.g., an inward facing sensor) has detected the presence of the pest in the trap 100, the circuit 138 may cause the shutter 110 to close, e.g., move from a substantially horizontal position to a substantially vertical position. For example, the sensors 108 may include a motion trap sensor, an imaging sensor (e.g., camera), a weight sensor (e.g., located between the shutter 110 and a bottom of the housing 102), a resistance sensor, or a capacitance sensor. The circuit 138 may cause the latch 132 to release the shutter 110 (e.g., when the shutter hinge 112 includes a spring that has tension when the shutter 110 is placed in the substantially horizontal position). As another example, the circuit 138 may cause a stepper motor in the shutter hinge 112 to move the shutter 110 from the horizontal position to the vertical position. In some cases, the circuit 138 may monitor a resistance or capacitance of the contacts 128 (that are connected to two metal plates located inside the container 106) to determine if a pest has entered the container 106. In response to the circuit 138 detecting pest due to a change in resistance (e.g., a lowering in resistance) or in capacitance, the circuit 138 may cause the shutter 110 to close, e.g., move from a substantially horizontal position to a substantially vertical position.

When the shutter 110 moves from the substantially horizontal position to the substantially vertical position, the shutter 110 may move the door 122 of the container 106 from a substantially horizontal position to a substantially vertical position, causing a top portion 136 of the door 122 to come in contact with the strip 124, thereby trapping the pest in the container. Substantially simultaneously with the shutter 110 moving from the horizontal to the vertical position, or shortly (e.g., less than one second) after the shutter 110 moves from the horizontal to the vertical position, the circuit 138 may cause power from the battery 116 to be applied to the rails 120. In some cases, a step-up power circuit (e.g., high current using a switching power supply) portion of the circuit 138 may cause the voltage and/or the current from the battery to be stepped-up (e.g., increased) to a level sufficient to electrocute a pest. For example, the power circuit portion of the circuit 138 may provide between 10 kilovolts (kV) and 100 kV at between 10 to 100 microamperes depending on the type of pest targeted by the trap 100. The stepped-up power that the circuit 138 provides to the rails 120 may flow through the contacts 128 of the container 106 to electrically conductive plates inside an inner bottom surface of the container 106 to electrocute the pest.

Substantially simultaneously with the shutter 110 moving from the horizontal to the vertical position, or shortly (e.g., less than thirty seconds) after, the circuit 138 may wirelessly (e.g., using Wi-Fi®, Bluetooth®, or the like) transmit a notification message. The wireless notification message may be sent over a network to a computing device, such as a tablet or a smartphone associated with a user, and may be displayed in an application ("app") being executed by the computing device. For example, a user, such as a homeowner, an employee of a pest control services provider, or a maintenance manager of a commercial building may receive the wireless notification message indicating that a pest was captured and electrocuted. The message may include additional information, such as an identifier or a location of the trap 100, a picture of the pest taken by an imaging sensor (e.g., one of the sensors 108), or the like.

After a user receives the notification message, the user (or a representative of the user) may open the lid 104 (e.g., using the lid handle 130), remove the container 106 that includes the pest (e.g., using the container handle 126), and dispose of the container 106. In this way, the user does not have to look at or touch the dead pest. Disposal of the pest is relatively sanitary as the dead pest is contained in the container 106 that has been sealed by placing the top 136 of the door 122 in contact with the strip 124. After disposing of the container 106, the user may re-arm the trap 100. For example, the user may place the shutter 110 in the horizontal position, confirm that the battery 116 has sufficient energy to power the trap 100, and confirm that there is a sufficient amount of the bait 114. The user may place the container 106 in the housing 102 with each of the contacts 128 making contact with a respective one of the rails 120 and re-place the lid 104 on top of the housing 102, thereby re-arming the trap 100. The container 106 may include a fuse or other mechanism to prevent the container 106 from being re-used after a pest has been electrocuted within the container 106. For example, after power has been applied to the rails 120, the power may travel from the rails 120 to the contacts 128 to electrify the conductive plates. Electrifying the conductive plates may cause the pest to be electrocuted and trip the fuse, preventing the container 106 from being reused.

The circuit 138 may be capable of modifying a rate at which the bait 114 is dispersed (e.g., released) into the surrounding atmosphere. For example, the circuit 138 may control a heater in the receptacle 118(1) in which the bait 114 is placed. By turning on the heater to heat the bait 114, the bait 114 may be dispersed more quickly. The circuit 138 may be capable of varying the amount of power provided to the heater. For example, the circuit 138 may heat the bait 114 to release more of the bait 114 when new bait is placed in the receptacle 118(1), when activity is sensed by an external facing sensor (e.g., motion sensor), at particular times during the day (e.g., at night when pests are more active), or any combination thereof. The bait 114 may be long term food attractant, such as an oil infused with an attractant. The circuit 138 may determine how long the bait 114 will last on a rate of diffusion, an ambient temperature (e.g., as measured by a temperature sensor in the sensors 108), a humidity (e.g., as measured by a humidity sensor in the sensors 108), a weight sensor, a microswitch, or the like. The circuit 138 may send a notification to an app executing on a computing device to notify a user (e.g., homeowner, maintenance worker, or pest services employee) that the bait 114 is to be replaced. If the bait 114 is liquid and stored in a bottle, the circuit 138 may monitor a sensor (e.g., electrodes, pressure sensor, or the like) in the bottle to determine how much of the bait 114 has been consumed, how much of the bait 114 is remaining, or both. For example, an oil-based liquid food drip bait 114 may last between one month to about six months depending on temperature, humidity, and the like. For an oil-based bait 114, the oil may be placed in a bottle with a cap through which a wick (e.g., cotton-based wick) protrudes. In some cases, the receptacle 118(1) may include one or more slits and a fan to blow the evaporating bait 114 out into the atmosphere surrounding the trap 100. The oil may be a nut-based (peanut oil, hazelnut oil, or the like) or a grain-based oil. In some cases, the circuit 138 may periodically (e.g., at a predetermined time interval) release the bait 114 into the atmosphere, e.g., by applying power to a heater, by triggering compressed air spray mechanism, or the like. In some cases, the circuit 138 may include an artificial intelligence algorithm to learn (using the sensors 108) when pests are present in a surrounding area and dispense additional amounts of the bait 114 at those times. The circuit 138 may monitor an outward facing sensor of the sensors 108. When the circuit 138 determines that the sensors 108 detect movement, the circuit 138 may automatically dispense a portion of the bait 114. In some cases, the bait 114 may be dry, such as small plastic balls (e.g., between about 4 to 8 millimeters (mm) in diameter) infused with an attractant.

In some cases, the circuit 138 may include an artificial intelligence algorithm with a preset number of pest profiles to enable the circuit 138 to analyze sensor data received from the sensor 108 to identify a type of pest captured by the trap 100. The circuit 138 may monitor sensor data received from outward facing sensors to analyze and provide suggestions as to where to place additional ones of the trap 100. The trap 100 may have multiple power modes, such as a low power mode during a time period when pest activity is unlikely, such as during the day (e.g., between sunrise and sunset), or when humans are present. For example, the circuit 138 may periodically communicate via a network to determine approximate sunrise and sunset times for a day, a week, or a month and use those times to determine when to transition to a low power mode. As another example, data from an external facing sensor (of the sensors 108) may be used by the circuit 138 to determine when a human is present.

The trap 100 may have a vacation mode that a user can wirelessly engage via a user interface ("UI") of an application ("app"). In vacation mode, the vent 142 may be closed and the circuit 138 may be placed in a low-power mode or an off mode.

Thus, the trap 100 provides several advantages over conventional pest traps. First, the pest is quickly and humanely killed using electrocution. Second, the dead pest is automatically placed in the closed container 106, enabling easy disposal. The user does not view the dead pest and can quickly and easily dispose of the container 106 that includes the dead pest. Third, the trap 100 uses a sensor (e.g., motion sensor) to detect the presence of a pest in the trap 100 and sends a notification when a pest has been captured, enabling a user (e.g., a homeowner, an employee of a pest services company, or a maintenance employee of a commercial building) to determine when a pest has been caught, without requiring the user to periodically check the status of the trap 100. Fourth, the bait 114 is easily replaceable and lasts a long time (e.g., typically 3 to 6 months). The user does not have to perform a messy manual process to place bait (e.g., peanut butter) in the trap 100.

Figure 2:
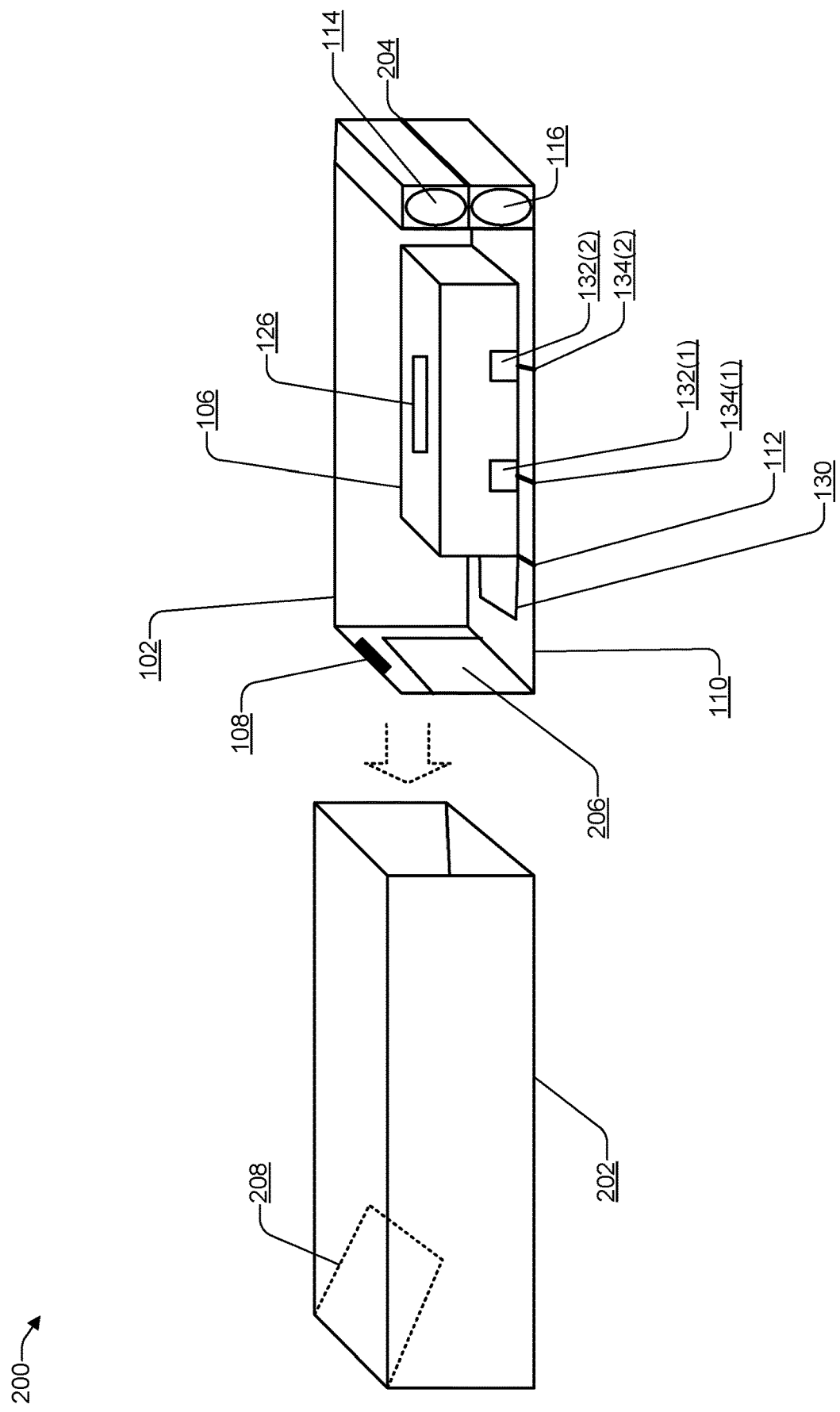
FIG. 2 is a block diagram illustrating a trap with an outer shell, according to some embodiments.

FIG. 2 is a block diagram illustrating a trap 200 with an outer shell, according to some embodiments. Rather than a removeable of hinged lid, the trap 200 may have an outer shell 202 into which the housing 102 may be slid. For example, a handle 204 on a rear external surface of the housing 102 may enable the housing 102 to be slid out and slid back into the outer shell 202. In some cases, the housing 102 may include one or more rails that fit into grooves on an inner surface of the outer shell 202, to guide the housing 102 when being slid in or out of the outer shell 202.

A user may use the handle 204 to slide out the housing 102 to place (or replace) the container 106, the bait 114, the battery 116, or any combination thereof. A front portion of the housing 102 may have an opening 206 that approximately lines up with an opening of the container 106 when the container 106 is placed in the housing 102. A plastic barrier 208 ("wall") may extend from an inner top of the outer shell 202 at an angle (e.g., between 0 and 90 degrees, preferably between about 30 to 60 degrees) to prevent a user (or a child) from extending an arm inside the container 106. Pests such as a mouse or a rat can flatten their bodies to squeeze into a small area. For this reason, the barrier 208 is able to prevent a user from extending an arm into the container 106 but does not prevent pests from flattening their bodies to enter into the container 106. In addition, after pests that are attracted by the bait 114 have flattened their bodies to enter the housing 102, the barrier 208 may prevent the pests from backing up to try and exit the housing 102. While the barrier 208 is illustrated as extending from a top front portion of the housing 102, in some cases the barrier 208 may extend from a bottom front portion of the housing 102, or from either side of the front portion of the housing 102. For example, the barrier 208 may be rotated at an angle of 90 degrees, 180 degrees, or 270 degrees (e.g., as compared to the barrier 208 illustrated in FIG. 2).

Figure 3A:
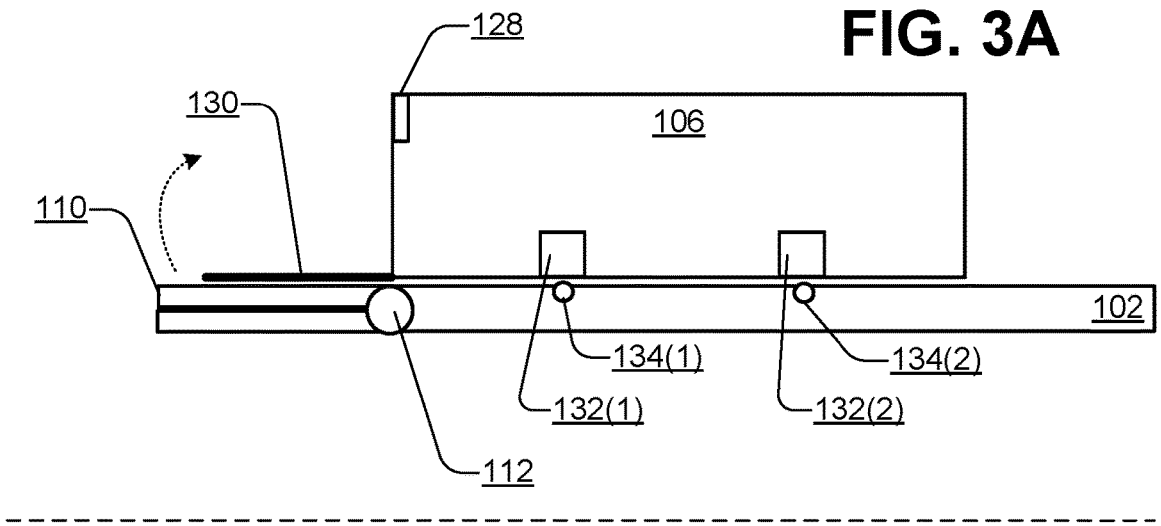
FIG. 3A is a block diagram illustrating a first position of a shutter of a trap closing a container door, according to some embodiments.
Figure 3B:
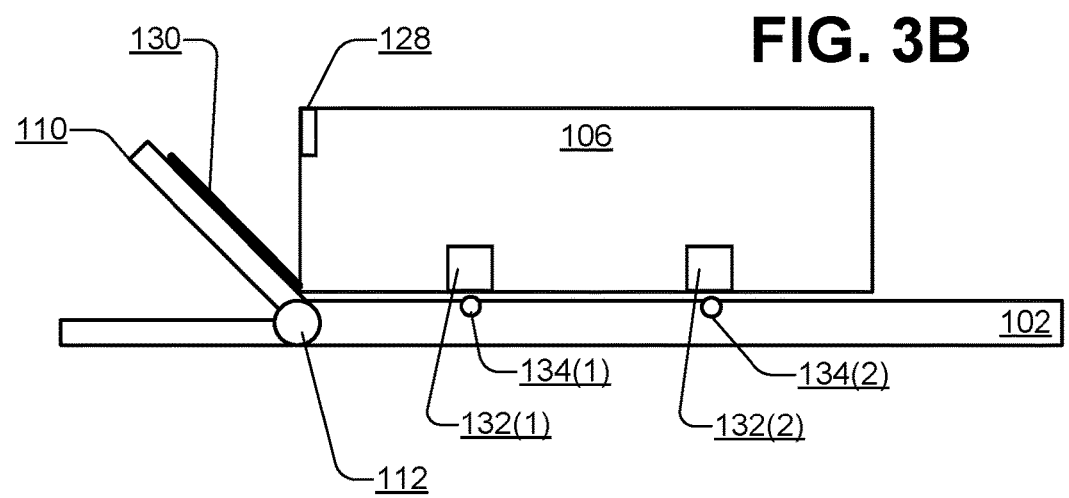
FIG. 3B is a block diagram illustrating a second position of a shutter of a trap closing a container door, according to some embodiments.
Figure 3C:
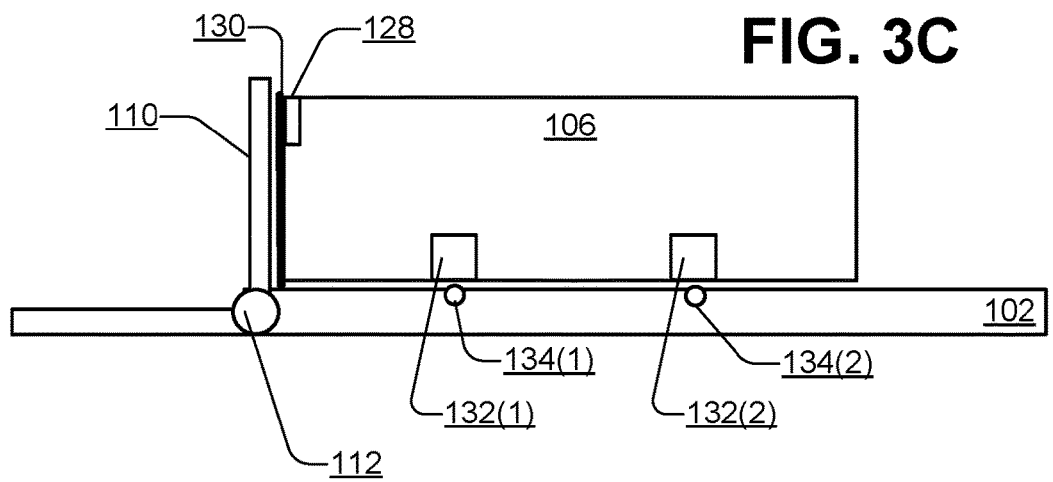
FIG. 3C is a block diagram illustrating a third position of a shutter of a trap closing a container door, according to some embodiments.

FIG. 3A is a block diagram illustrating a first position of a shutter of a trap closing a container door, according to some embodiments. FIG. 3B is a block diagram illustrating a second position of a shutter of a trap closing a container door, according to some embodiments. FIG. 3C is a block diagram illustrating a third position of a shutter of a trap closing a container door, according to some embodiments. The shutter hinge 112 may include a coiled spring, a stepper motor, or another type of mechanism to enable the shutter 110 to move from a substantially horizontal position, such as the first position illustrated in FIG. 3A, through an angled position, such as the second position illustrated in FIG. 3B, to a substantially vertical position, such as the third position illustrated in FIG. 3C. In FIG. 3C, the shutter 110 may cause a top portion of the door 130 to make contact with the adhesive strip 128, thereby sealing the pest into the container 106.

Figure 4:
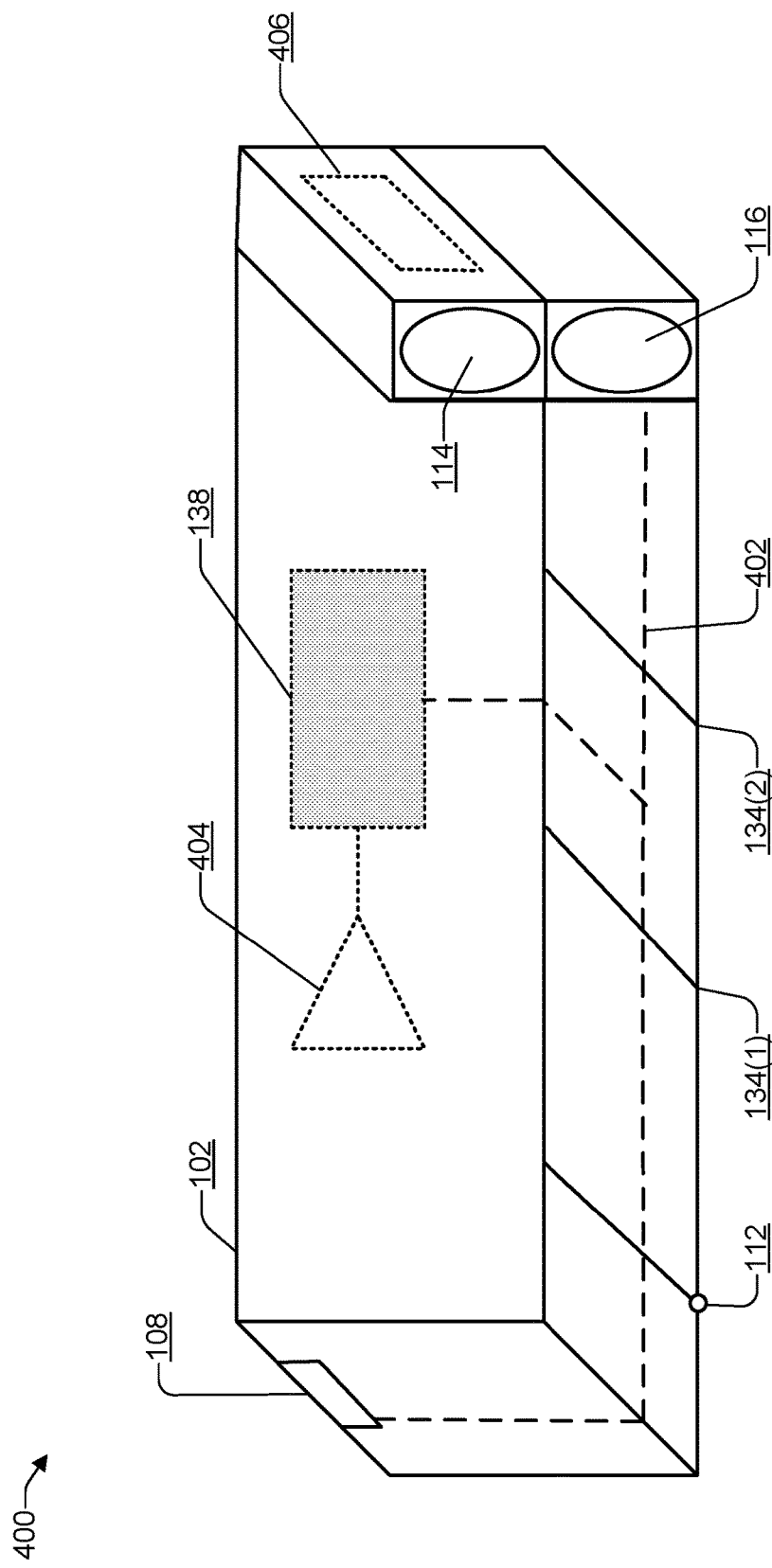
FIG. 4 is a block diagram illustrating a trap that include a communications interface, according to some embodiments.

FIG. 4 is a block diagram 400 illustrating a trap that includes a communications interface, according to some embodiments. The circuit 138 may be connected, electrically, communicatively, or both to the battery 116, the rails 134, and the sensors 108 via cables 402 in the housing 102. For example, the housing 102 may be made from a type of plastic. The cables 402 may be embedded into the plastic of the housing 102 or the cables 402 may run on a inner bottom surface of the housing 102.

The battery 116 may provide power (e.g., voltage at a particular amount of current) to the circuit 138 and the sensors 108. The circuit 138 may step-up the power (e.g., by stepping up the voltage and/or the current) provided by the battery 116 sufficient to electrocute a pest and provide the stepped-up power via the rails 134. The circuit 138 may include an antenna 404 to wirelessly communicate with other devices, including other traps, a central server, and a computing device associated with a user. The housing 102 may include a diffuser 406 near where the bait 114 is located to circulate the evaporated scent of the attractant in the bait 114 into the area surrounding the housing 102. The diffuser 406 may include a fan or other mechanism to further circulate the scent.

Figure 5:
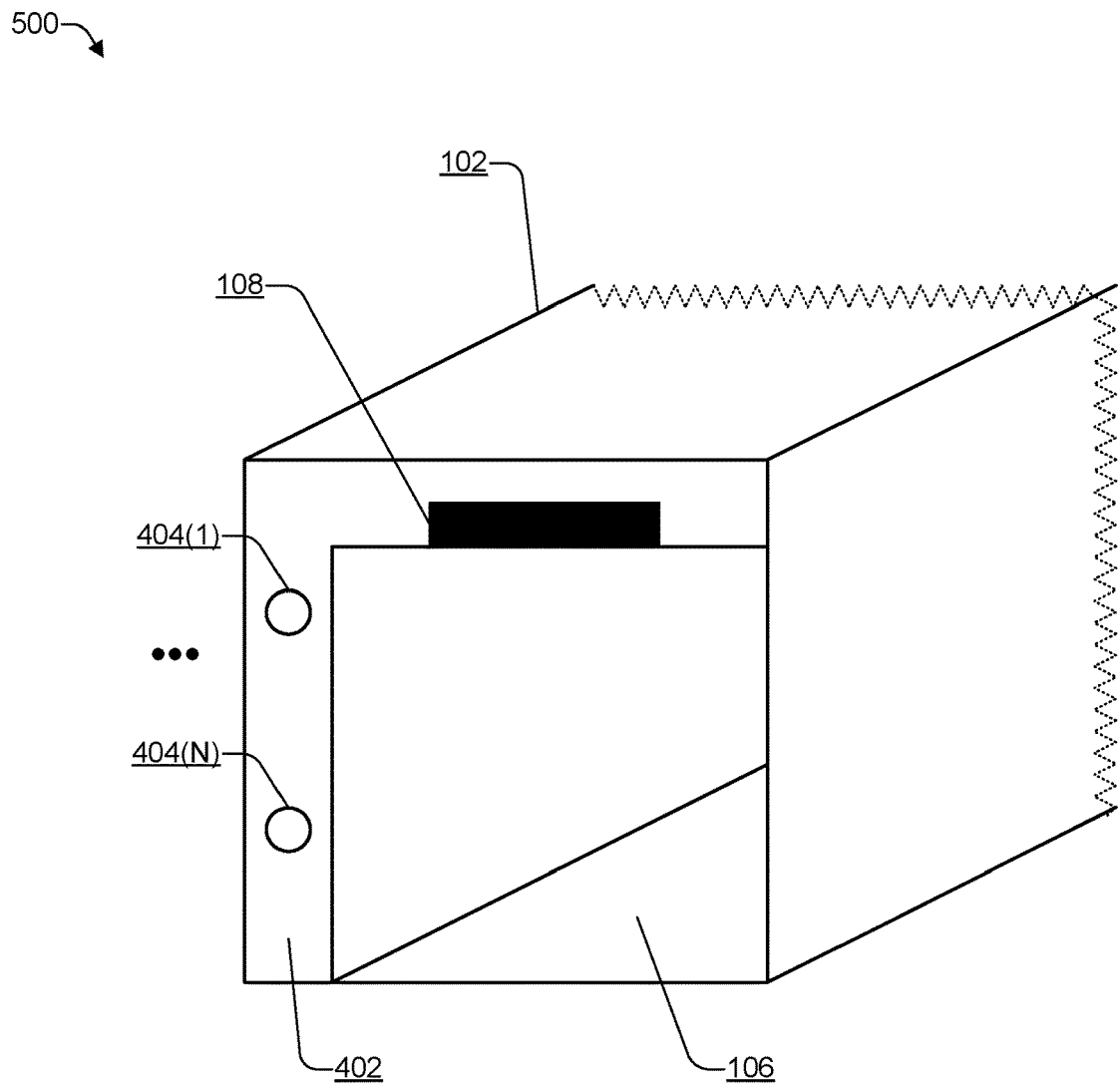
FIG. 5 is a block diagram illustrating a front panel of a trap, according to some embodiments.

FIG. 5 is a block diagram 500 illustrating a front panel of a trap, according to some embodiments. A front panel 402 of the housing 102 may include one or more indicators, such as, for example, an indicator 404(1) to an indicator 404(N) (where N>0). For example, each of the indicators 404 may use light emitting diodes (LED), organic LED (OLED), or another type of technology. Each of the indicators 404 may visually provide information about a status of a power source (e.g., the battery 116), an amount of the bait 114, a network connectivity of the trap (e.g., the circuit 138), whether a pest has been captured (and electrocuted) in the container 106, and other information related to the trap 100. For example, one of the indicators 404 may visually provide information about a status of a power source (e.g., the battery 116) by indicating green (sufficient power), yellow (power level is nearing a threshold below which the trap may not function properly), and red (battery needs to be replaced). Another of the indicators 404 may visually provide information about a status of an amount of the bait 114 by indicating green (sufficient bait), yellow (amount of bait is nearing a threshold below which the trap may not function properly), and red (bait needs to be replaced). Yet another of the indicators 404 may visually provide information about a network connectivity of the trap (e.g., the circuit 138) by indicating green (connected to the network), yellow (transmission issues), and red (unconnected to the network). Another of the indicators 404 may visually provide information about whether a pest has been captured (and electrocuted) in the container 106 by indicating green (armed) and red (pest captured, e.g., the container 106 is to be disposed of and replaced with a new container).

Figure 6:
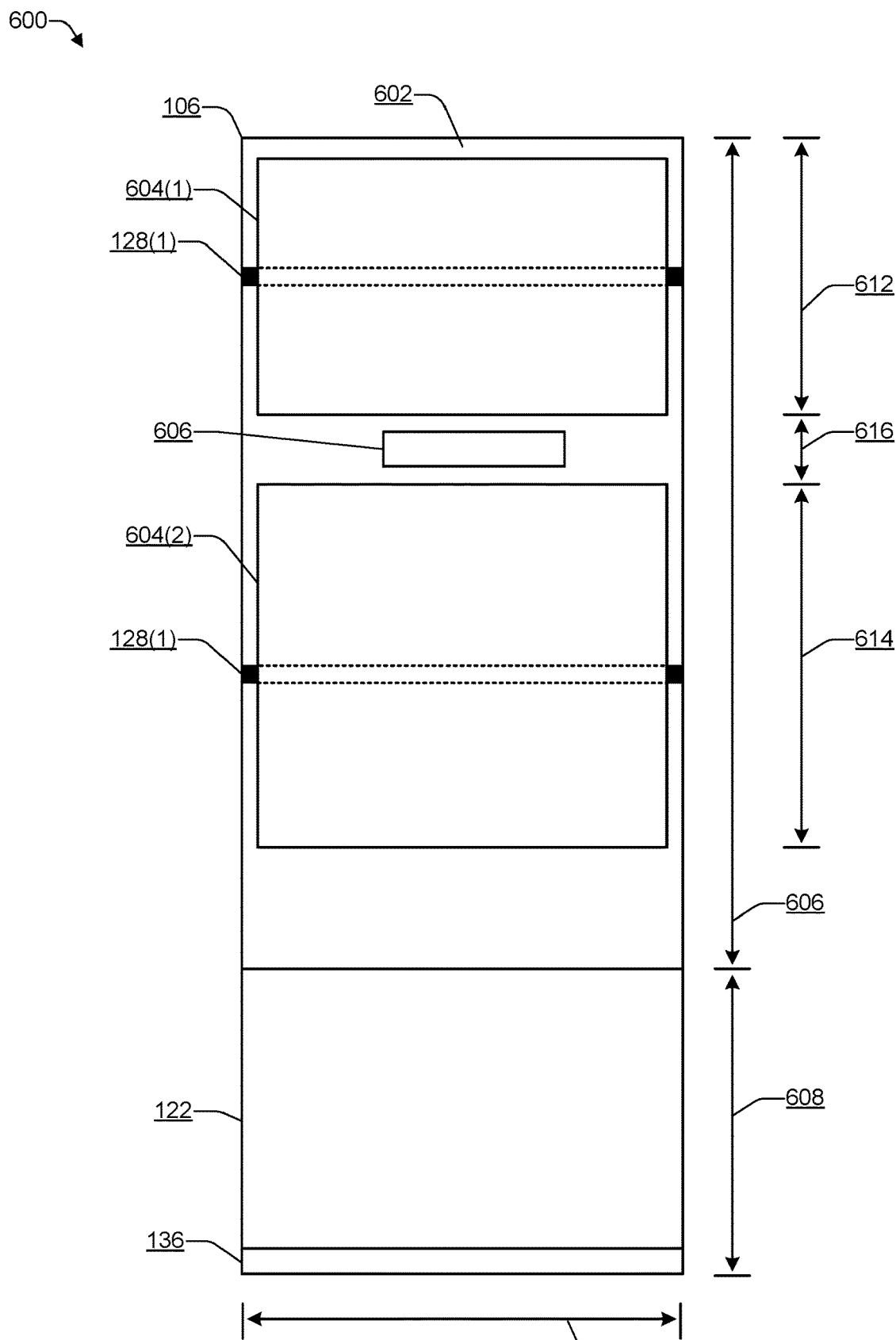
FIG. 6 is a block diagram illustrating a portion of a container, according to some embodiments.

FIG. 6 is a block diagram illustrating a portion of a container, according to some embodiments. An inner bottom surface 602 of the container 106 may include a conductive plate 604(1) connected to the contact 128(1) and a conductive plate 604(2) connected to the contact 128(2). The conductive plates 604 may conduct power provided by the rails 120 via the contacts 128. The conductive plates 604 may be thin and made from a metal (e.g., aluminum) or a metal alloy (e.g., aluminum alloy). Each of the contacts 128 may run along an exterior width of the container 106 to make contact with one of the corresponding rails 120 when the container 106 is placed inside the housing 102. The conductive plates 604 may be metal plates that are glued to an inner surface of the container 106, a metallic film that is applied to the inner surface of the container 106, a metallic paint (e.g., liquid) that is applied to the inner surface of the container 106 and then is shipped to a user after the metallic paint has dried, or the like.

After a pest enters into the container 106, the circuit 138 of FIG. 1 may cause power from the battery 116 to be applied to the rails 120. In some cases, a step-up power circuit (e.g., high current using a switching power supply) portion of the circuit 138 may cause the voltage and/or the current from the battery to be stepped-up (e.g., increased) to a level sufficient to electrocute a pest. For example, the power circuit portion of the circuit 138 may provide between 10 kV and 100 kV at between 10 to 100 microamperes depending on the type of pest targeted by the trap 100. The stepped-up power that the circuit 138 provided to the rails 120 may flow through the contacts 128 of the container 106 to electrically conductive plates inside an inner bottom surface of the container 106 to electrocute the pest. When power is supplied to the contacts 128, each of the conductive plates 604 may have an opposite charge, e.g., one of the conductive plates 604 may be positive while the other of the conductive plates 604 may be negative, causing power to flow through the body of the pest, thereby electrocuting the pest. In addition, when power is supplied to the contacts 128, a fuse 606 may blow, thereby preventing the container 106 from being reused. The fuse 606 may be electrically connected to one or more of the contacts 128. The circuit 138 may provide, for a predetermined amount of time (e.g., between about 100 milliseconds (ms) to 1000 ms), a first amount of power that is (1) sufficient to electrocute the pest but (2) insufficient to blow the fuse 606. After providing the first amount of power, the circuit 138 may briefly (e.g., between about 1 ms to 10 ms) provide a second amount of power (that is greater than the first amount of power) sufficient to trip the fuse 606. In some cases, the circuit 138 may monitor (e.g., via the contacts 128) a resistance or capacitance of the conductive plates 604 to determine if a pest has entered the container 106. In response to the circuit 138 detecting a pest due to a change in resistance or due to a change in capacitance, the circuit 138 may cause the shutter 110 to close, e.g., move from a substantially horizontal position to a substantially vertical position, thereby causing the top 136 of the door 122 to come in contact with the strip 124 (of FIG. 1), thereby trapping the pest inside the container 106.

To catch a mouse, the container 106 may have an overall length 606 of between 100 millimeters (mm) to 300 mm. The door 122 of the container 106 may have a height 608 and a width 610 of between 50 and 80 mm. For example, in a particular embodiment the container 106 may have a length 606 of 200 mm, a width 610 of 75 mm, and a height 608 of 60 mm. The conductive plate 604(1) may have a width 612 of about 40 mm, the conductive plate 604(2) may have a width 614 of about 70 mm. A distance 616 between the conductive plate 604(1) and the conductive plate 604(2) may be about 10 mm. Of course, to catch a rat, the dimensions of the trap 100, including the container 106 may be about 3 to 4 times greater.

Figure 7:
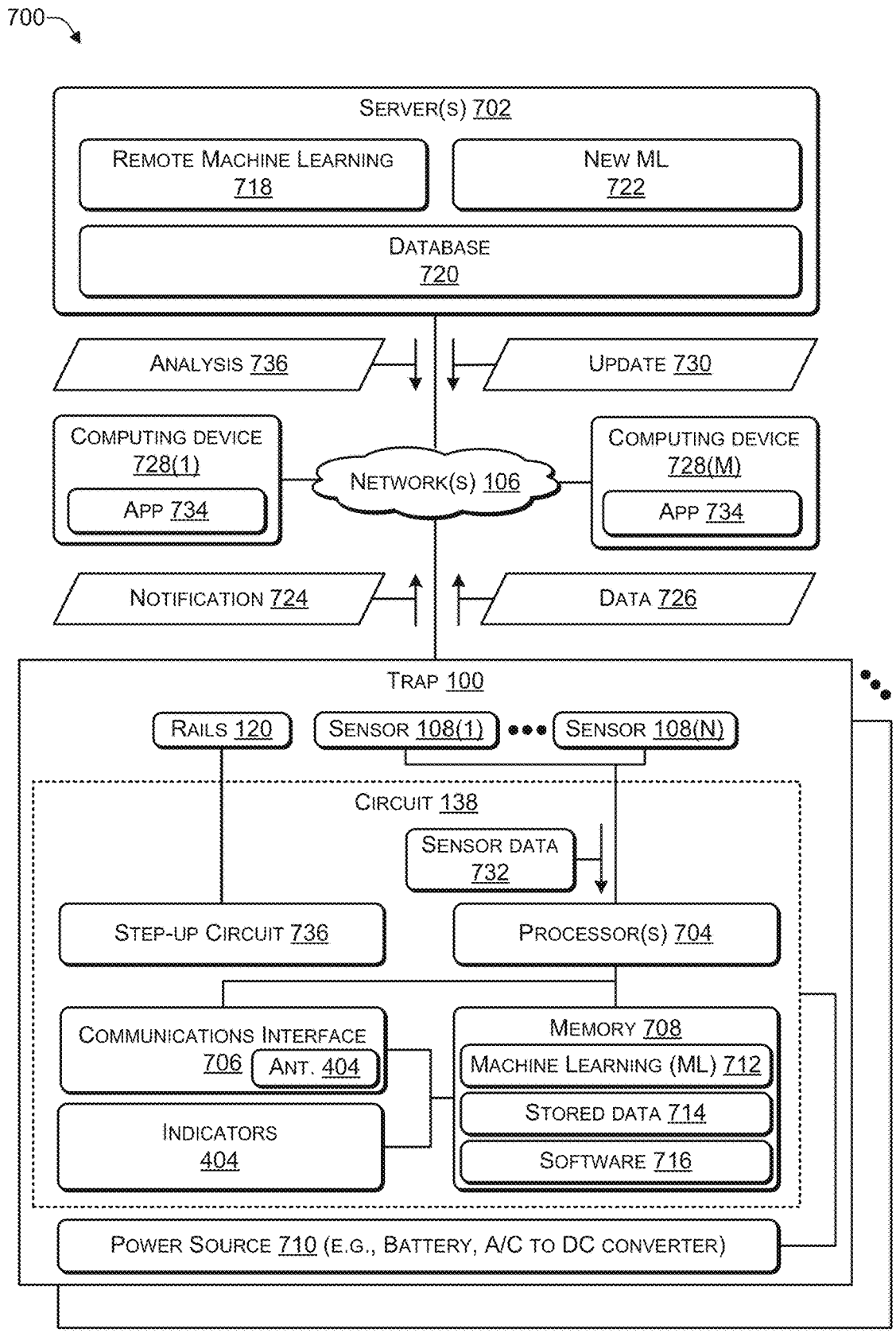
FIG. 7 is a block diagram of a system that includes multiple traps wirelessly communicating over a network, according to some embodiments.

FIG. 7 is a block diagram of a system 700 that includes multiple traps (e.g., such as the trap 100 of FIG. 1) connected to a network, according to some embodiments. In the system 700, multiple traps, such as the representative trap 100, may be coupled to one or more servers 702, and one or more computing devices 728(1) to 728(M) (M>0), via one or more networks 106. For example, the computing device 728(1) may be a user device, such as a smart phone, tablet, or voice-assistant enabled device. The computing device 728(M) may be a device associated with a pest control services company. For example, when the trap 100 captures a pest, the pest control services company may contact an owner (or manager) of a property, indicate that a pest has been captured, and make an appointment to enter the property, dispose of the pest, and re-arm the trap 100.

Figure 8:
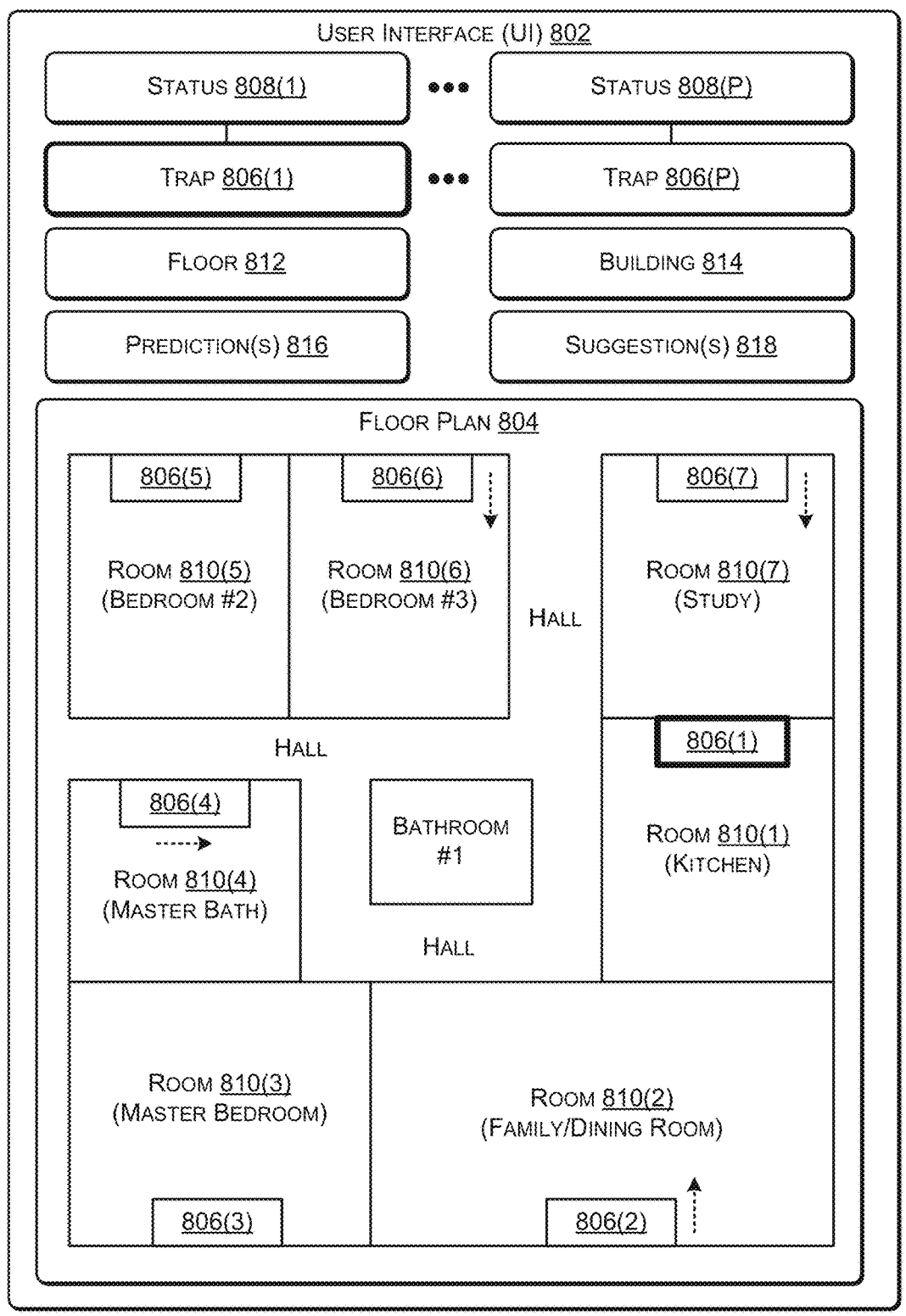
FIG. 8 is a block diagram illustrating a user interface to display locations of multiple traps, according to some embodiments.

The representative trap 100 may include the sensors 108(1) to 108(N), one or more processors 704, a communications interface 706, a memory 708, and a power source 710. The processors 704 may include custom logic devices or off-the-shelf processors that use a design by a company such as Intel®, AMD®, ARM®, or the like. The communications interface 706 may be capable of communications using one or more wired or wireless protocols, such as, for example, Ethernet®, Wi-Fi®, ZigBee®, Bluetooth®, another type of communications protocol, or any combination thereof. For example, the communications interface 706 may be capable of (1) creating a mesh network with other traps, (2) communicating with a user device that is executing an application 734 (e.g., as illustrated in FIGS. 7 and 8) associated with the trap 100, (3) communicating with the servers 702, or any combination thereof. The memory 708 may include any type of non-transitory computer-readable storage media, including random access memory (RAM), solid state drive (SSD), removable memory (e.g., Secure Digital (SD) or micro SD), or the like. The power source 710 may be capable of converting A/C power to direct current (DC) and may enable the trap 100 to be plugged into an A/C wall outlet or use a battery source (e.g., the battery 116 of FIG. 1) for power. In some cases, the power source 710 may include a rechargeable battery (e.g., the battery 116 of FIG. 1) that receives a trickle charge from the power source 710. In this way, the trap 100 may remain active (e.g., by using power from the rechargeable battery) when the A/C power is temporarily unavailable (e.g., due to a power failure). The circuit 138 may include a step-up circuit 736 to step-up a voltage, a current, or both that are provided by the power source 710. The step-up circuit 736 may step-up the voltage and/or the current sufficient to electrocute the type of pest that the trap 100 is designed to capture. For example, the voltage and/or current produced by the step-up circuit 736 may be higher when the trap 100 is designed to capture a rat and lower when the trap 100 is designed to capture a mouse.

The memory 708 may be used to store software applications and data. For example, the memory 708 may store a machine learning algorithm (ML) 712 that has been trained to recognize shapes, sounds, or other sensor data associated with a particular set of pests. For example, if the trap 100 is intended for indoor use, the ML 712 may be trained to recognize indoor pests (e.g., mice, rats, and the like) associated with a particular geographic region. If the trap 100 is intended for outdoor use, the ML 712 may be trained to recognize outdoor pests (e.g., rats, squirrels, and the like) associated with a particular geographic region. In some cases, the manufacturer of the trap 100 may charge a fee to download an updated machine learning algorithm. For example, if a user moves from one geographic region to another, the user may pay a fee and download a machine learning algorithm trained to identify pests in the new geographic region.

When one of the sensors 108 (e.g., a motion trap) detects a pest, additional ones of the sensors 108 may capture sensor data 732 (e.g., image data, audio data, and the like) associated with the pest. The ML 712 may analyze the sensor data 732 to determine a type of the pest. For example, the ML 712 may identify a digital image in the sensor data 732 to match an image of a mouse, a rat, a squirrel, or another type of pest. As another example, the ML 712 may determine that audio data included in the sensor data 732 matches that of a mouse, a rat, a squirrel, or another type of pest.

The trap 100 may receive data (e.g., digital image files, audio files, motion data, and the like) from the sensors 108 and store the data to create stored data 714. The stored data 714 may be stored in a first in first out (FIFO) circular buffer, with older data being overwritten by newer data. The memory 708 may store software 716. For example, the software 716 may receive ambient light data from an ALS (of the sensors 108) and determine whether to transition the trap 100 from a low power mode to an active mode (e.g., when the data satisfies a predetermined threshold, e.g., indicating that the trap's location is relatively dark) or from the active mode to the low power mode (e.g., when the data does not satisfy the predetermined threshold, e.g., indicating that the trap's location is relatively well lit). The software 716 may indicate in which mode the trap 100 is currently using one of the indicators 404 (e.g., green=active, yellow=standby). The software 716 may determine whether the trap 100 is connected to the network 106 using the communications interface 706 and display the connection status using one of the indicators 404 (e.g., green=connected, red=disconnected). The software 716 may use one of the indicators 404 to indicate whether the trap 100 is being powered by A/C power or battery power (e.g., green=A/C, yellow=battery). The software 716 may use one of the indicators 404 to indicate whether the trap 100 has captured a pest (e.g., green=armed with no pests, red=pest captured).

After software 716 determines, using the sensor data 732, that a pest has entered the trap 100, the software 716 may send a notification 724 to one or more of the computing devices 728 (e.g., for display in a UI of the app 734). The software 716 may send data 726, such as sensor data received from one or more of the sensors 108, to the computing devices 728. In some cases, the notification message 724 may include the sensor data 732 (e.g., the data 726). For example, the computing device 728(1) may receive the notification 724 and provide an audible and/or visual indication that a pest detection notification was received. The user may open the UI of the app 734 on the computing device 728(1). The computing device 728(1) may receive and display the data 726 (e.g., one or more digital images captured by the sensors 108). Receiving the notification 724 may cause a computing device, such as the computing device 728(1), to automatically (e.g., without human interaction) launch the app 734 and automatically display the notification 724 (and display the data 726) within a user interface (UI) of the app 734.

The servers 702 may be hardware servers, cloud-based servers, or a combination of both. The servers 702 may store a remote ML algorithm 718 and a database 720. The remote ML 718 may be much larger and more sophisticated and may be capable of recognizing many more pests than the ML 712 used by the trap 100. The server 702 may receive and store the data 726 in the database 720. The database 720 may store data received from multiple traps deployed in multiple geographic regions over a long period of time. In contrast, the stored data 714 in the trap 100 may have a limited size and may store data acquired over a relatively short period of time. If the data 726 indicates that the trap 100 was unable to recognize the pest, the data 726 may be added to the database 720 and the remote ML 718 may retrain the machine learning algorithm using at least a portion of the database 720 to create a new trap ML 722. The server 702 may send an update 730 that includes the new trap ML 722 to one or more traps via the network 106. For example, if the server 702 determines that a particular pest that was relatively absent has now become prevalent in a particular geographic region, the server 702 may create and send the new trap ML 722 to traps located in the particular geographic region. In this way, the server 702 may continually provide update the traps 100 to detect new and evolving pests (e.g., bigger or smaller pests, different varieties of pests, and the like). The remote ML 718 may perform an analysis 736 of the data 726 received from traps located in a particular structure (e.g., traps in the same house, warehouse, industrial plant, restaurant, apartment building, or the like) and provide the analysis 736 to the computing devices 728. The app 734 may display the analysis 736, including predictions pertaining to the pests being trapped. The sensors 108 may include a temperature sensitive sensor, such as, for example, a thermistor and a humidity sensor (e.g., using capacitive, resistive, or thermal conductivity technology). The temperature sensitive sensor may capture temperature data and the humidity sensor may capture humidity data and send the captured data to the ML 712. The remote ML 718 may be trained to consider temperature and humidity and make predictions based on the temperature data and the humidity data. For example, for traps that are placed outside, the remote ML 718 may make predictions based on current weather conditions, including temperature, humidity, and weather forecasts e.g., "Rats are predicted because the temperature is greater than X degrees", "Mice are predicted because the temperature is greater than X degrees and the humidity is less than Y", and so on. The predictions may be based on (1) previous data gathered under similar conditions (e.g., temperature X, humidity Y for Z length of time during a particular month or set of months usually causes the number of mice to increase significantly) and (2) data gathered from traps located nearby (e.g., "several of your neighbors have experienced an increase in rat activity in the past few days"). The server 702 may aggregate data from multiple traps deployed in multiple locations (e.g., houses or buildings) and make predictions. For example, increased activity in multiple buildings that are in close proximity to each other may cause the remote machine learning 718 to predict a large-scale infestation spanning the multiple buildings.

In some cases, if there are multiple traps deployed in a building, the traps may create a mesh network. The server 702 may send the update 730 to one of the multiple traps and instruct the trap that receives the update 730 to share the update 730 with the other traps in the building, via the mesh network.

FIG. 8 is a block diagram 800 illustrating a user interface to display locations of traps, according to some embodiments. A computing device, such as one of the computing devices 728 of FIG. 7, may execute an application (e.g., the app 734 of FIG. 7) provided by a manufacturer of the trap 100. The application may display a user interface (UI) 802 that includes a floor plan 804 for a property or a location.

In some cases, the application 734 of FIG. 7 may send the floor plan 804 to the server 702 and the remote machine learning 718 may determine locations where multiple traps 806(1) to 806(P) are to be placed. A homeowner may, in some cases, pay for a service that uses the remote machine learning 718 to determine in which locations the traps 806 are to be placed. The server 702 of FIG. 7 may send data to one of the computing devices 728 (e.g., the homeowner's device) to enable the UI 802 to display the floor plan 804 and superimpose the locations on the floor plan 804. The homeowner may deploy the traps 806 according to the locations specified in the floor plan 804. Alternately, a commercial pest control service that has a service agreement with an owner may measure the rooms in a house or a building, create the floor plan 804, and send the floor plan to the server 702. The remote machine learning 718 may determine the locations in which the traps 806 are to be placed (e.g., based on an analysis of where pests tend to nest) and send data to one of the computing devices 728 (e.g., a device of the pest control service) to enable the UI 802 to display the floor plan 804 and superimpose the locations of the traps 806 on the floor plan 804. An employee of the pest control service may deploy the traps 806 based on the locations superimposed on the floor plan 804.

The UI 802 may display the traps 806 deployed within an area displayed by the floor plan 804 and a corresponding status 808 corresponding to each of the traps 806. The information displayed by the status 808 is described in more detail in FIG. 8. The floor plan 804 may display one or more rooms 810(1) to 810(P) (P>0) and provide an indication as to an approximate location of each of the traps 806(1) to 806(P). The UI 802 may provide a visual indicator identifying a trap that recently captured a pest or that detected a pest via an external facing sensor. For example, in FIG. 8, the UI 802 visually indicates that the trap 806(1) recently captured (or detected) a pest. The UI 802 may display arrows (e.g., see rooms 810(2), 810(4), 810(6), and 810(7)) indicating a direction in which external sensors of the traps 806 have detected pest movement.

While the floor plan 804 illustrated in FIG. 8 is of a single-family home, other floor plans may also be displayed by the UI 802. For example, the UI 802 may include a floor selector 812 to enable a user to select a particular floor of multiple floors of a building (a house, apartment, or commercial building), a building selector 814 to enable a user to select a particular building of multiple buildings (e.g., a particular warehouse of multiple warehouses), and the like. In some cases, the UI 802 may enable a user to zoom in and out, e.g., zoom out to view multiple buildings having multiple floors, zoom into a particular building, a particular floor, and a particular room of the particular floor.

The UI 802 may display one or more predictions 816 (e.g., included in the analysis 636) determined by the remote ML 618. The predictions 816 may be based on correlating the individual data (e.g., the data 726 of FIG. 7) sent from individual ones of the traps 806(1) to 806(P) to the server 104. The predictions 816 may include, for example, "Mice appear to be nesting in room 810(1)". The UI 802 may display one or more suggestions 818 (e.g., determined by the remote ML 618 and included in the analysis 636), such as, for example, "Consider moving trap 806(6) from room 810(6) to bathroom #1 as pest movement data indicates that pests may be moving to that area". The predictions 816 and the suggestions 818 may be determined by the remote ML 718 of FIG. 7. For a commercial pest control service, the suggestions 818 may include suggestions to re-deploy at least some of the traps from a first house associated with a first customer to a second house associated with a second customer. For example, the traps in the first house may determine that pest activity has decreased (e.g., pest activity rarely detected) while the traps in the second house may determine that pest activity has increased. By selectively redeploying pest traps that the pest control service has already acquired based on the remote machine learning algorithm, the pest control service may avoid acquiring additional pest traps and instead redeploy pest traps based on the amount of activity detected in each house.

Figure 9:
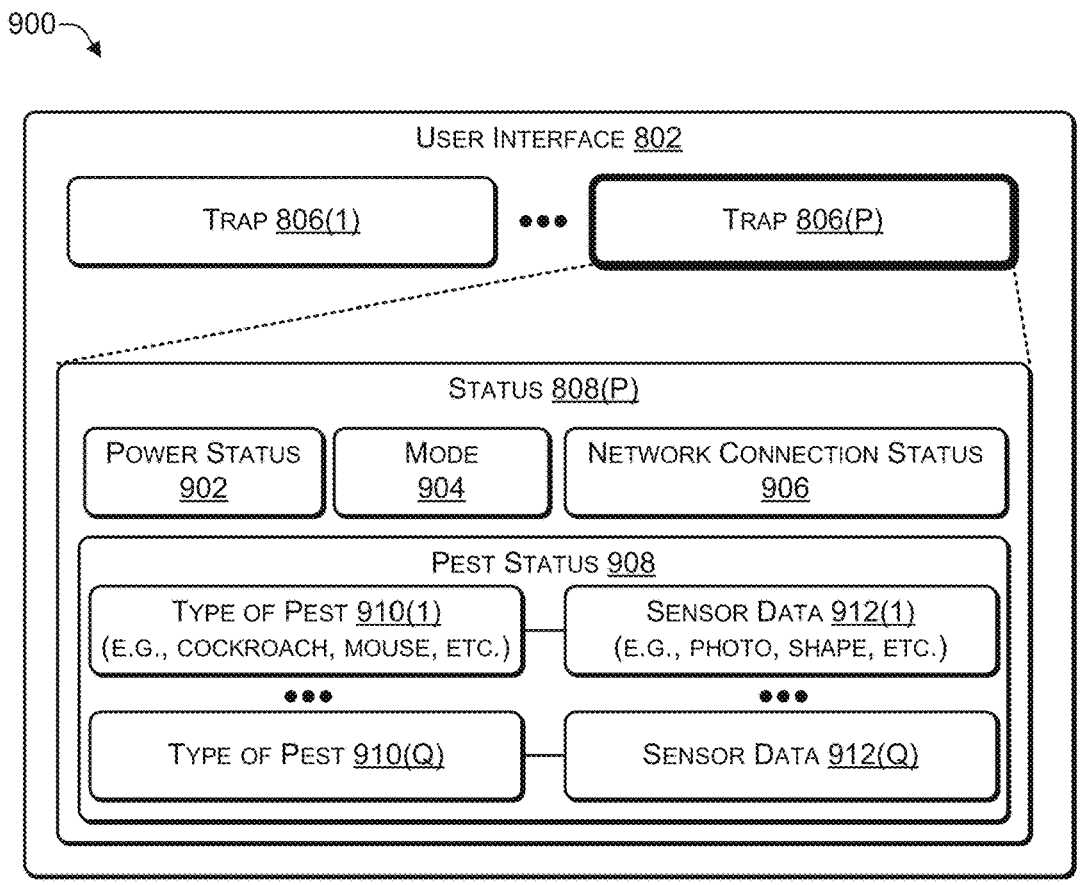
FIG. 9 is a block diagram illustrating a user interface to display data gathered by a trap, according to some embodiments.

FIG. 9 is a block diagram 900 illustrating a user interface to display data gathered by a trap, according to some embodiments. The UI 802 may visually display the traps 806(1) to 806(P) and their corresponding status. The user may select a particular trap, such as the trap 806(P) illustrated in FIG. 9. In response, the UI 802 may display the corresponding status, such as the status 808(P).

The status 808(P) may include a power status 902, a mode 904, a network connection status 906, and a pest caught or detected status 908. The power status 902 may indicate whether the trap 806 is being powered by A/C power or battery power (e.g., green=A/C, yellow=battery). The mode 904 may indicate a mode (e.g., active mode or low power mode) of the trap 806 (e.g., green=active, yellow=standby). The network connection status 906 may indicate whether the trap 806 is connected to a network (e.g., green=connected, red=disconnected). The pest caught or detected status 908 may indicate whether the trap 710 has caught a pest or an external facing sensor has detected a pest (e.g., green=no pests detected, yellow=pest detected, red=pest caught). If at least one pest was detected, the pest detected 808 may display each type of pest 810(1) to 810(Q) (Q>0) that was detected and the associated sensor data 812(1) to 812(Q). For example, if three different sized mice were detected, an image of each of the three may be displayed. As another example, if mice were detected behind a wall, an ultrasound or other type of image may be displayed and an audio recording of the noises made by the mice may be made available for playback.

When the UI 802 receives a notification and sensor data from a trap (e.g., the notification 724 and the data 726 from the trap 100), the UI 802 may visually indicate that the trap (e.g., the trap 806(P)) has caught or detected a pest, display the type of the pest 810 and the corresponding sensor data 812.

Figure 10:
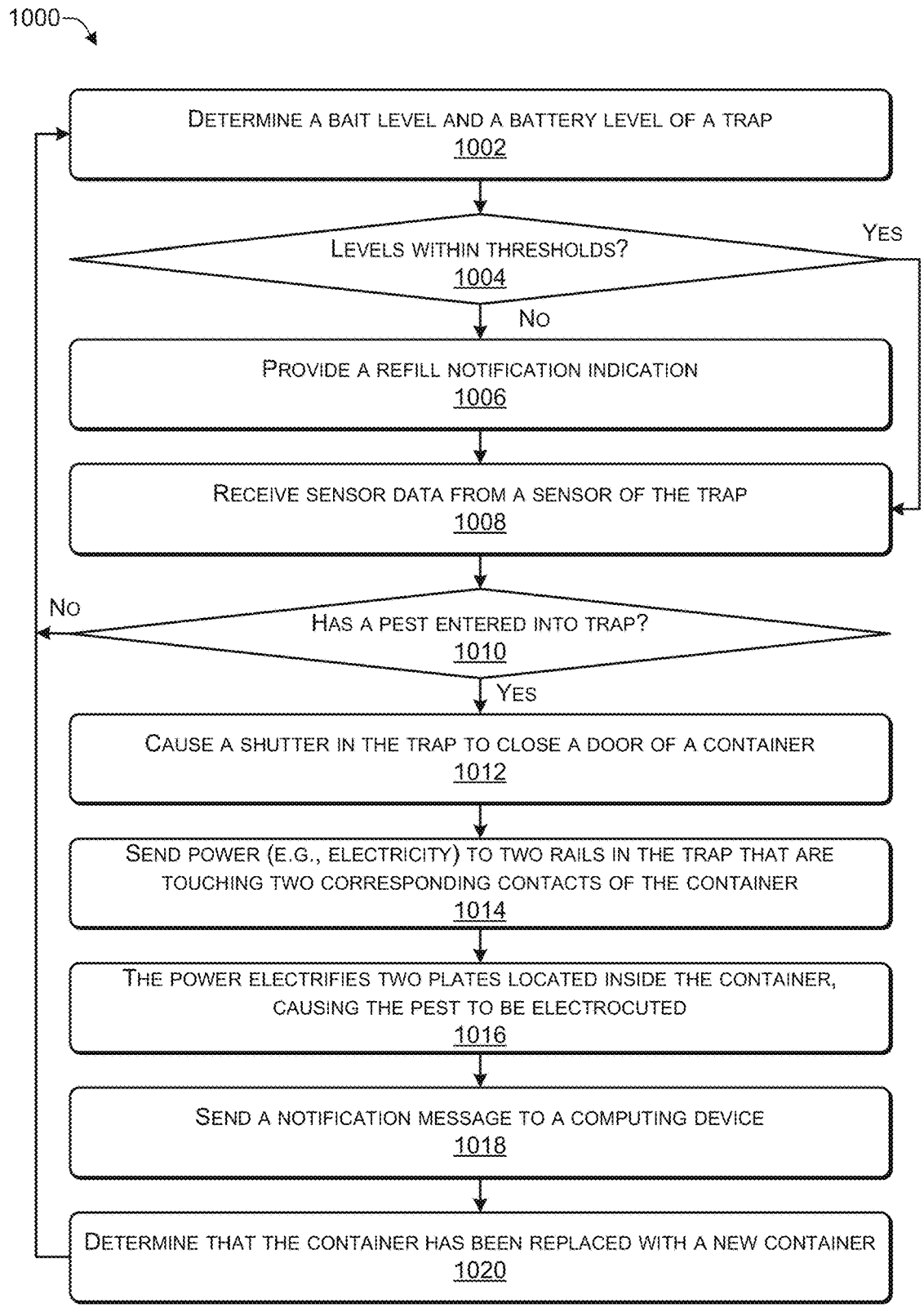
FIG. 10 is a flowchart of a process that includes electrifying two plates located inside a container, according to some embodiments.

In the flow diagrams of FIG. 10, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 1000 is described with reference to FIGS. 1, 2, 3, 4, 5, 6, 7, 8, and 9 as described above, although other models, frameworks, systems and environments may be used to implement these processes.

FIG. 10 is a flowchart of a process 1000 that includes electrifying two plates located inside a container, according to some embodiments. The process 1000 may be performed by one or more components of the trap 100 of FIG. 1 or the trap 200 of FIG. 2, such as, for example, the circuit 138.

At 1002, the process may determine a bait level and a battery level of a trap. The process may make a determination, at 1004, whether the bait level satisfies a first predetermined threshold and whether the battery level satisfies a second predetermined threshold. If a determination is made, at 1004, that the bait level does not satisfy the first predetermined threshold, the battery level does not satisfy the second predetermined threshold, or both, then the process may proceed to 1006, where the process provides a refill notification indication. If a determination is made, at 1004, that the bait level satisfies the first predetermined threshold and the battery level satisfies the second predetermined threshold, then the process may proceed to 1008. For example, in FIG. 1, the circuit 138 may determine an amount of a voltage and/or current being provided by the battery 116. If the voltage and/or current is below a particular threshold (or pair of thresholds), then the circuit 138 may (i) provide an indication using one of the indicators 404 of FIG. 4, (ii) send a notification message (e.g., the notification 724) to one or more of the computing devices 728, or both, indicating that the battery 116 is to be replaced. The circuit 138 may determine an amount of remaining life of the bait 114, e.g., based on when the bait 114 was initially placed in the receptacle 118(1) and an evaporation rate of the bait 114. If the level of the bait 114 is below a particular threshold (or pair of thresholds), then the circuit 138 may (i) provide an indication using one of the indicators 404 of FIG. 4, (ii) send a notification message (e.g., the notification 724) to one or more of the computing devices 728, or both indicating that the bait 114 is to be replaced.

At 1008, sensor data may be received from a sensor of a trap. At 1010, a determination may be made whether the sensor data indicates that a pest has entered into the trap. If a determination is made, at 1010, that the sensor data indicates that a pest has not entered into the trap, then the process may proceed to 1002. If a determination is made, at 1010, that the sensor data indicates that a pest has entered into the trap, then the process may proceed to 1012.

At 1012, the process may cause a shutter in the trap to close a door of a container. At 1014, power (e.g., electricity) may be sent to two rails in the trap that are touching two corresponding contacts of the container. At 1016, the power sent to the rails touching the contacts of the container may electrify two plates located inside the container, causing the pest to be electrocuted. In some cases, the process may perform 1012 and 1014 substantially simultaneously. For example, in FIG. 3, the process may cause the shutter 110 to move from a substantially horizontal position (FIG. 3A) to a substantially vertical position (FIG. 3C). For example, the process may provide electricity to a motor located inside the shutter hinge 112, causing the motor to rotate the shutter 110 as illustrated in FIGS. 3A, 3B, and 3C. As another example, the process may release the latch 132 of FIG. 1, causing a spring-loaded mechanism inside the shutter hinge 112 to rotate the shutter 110 as illustrated in FIGS. 3A, 3B, and 3C. The process may provide power (e.g., from the step-up circuit 736 of FIG. 7) to the rails 120. The power 120 may travel from the rails 120 to the contacts 128 of the container 106. The power may travel from the contacts 128 to the conductive plates 604. The power may from one of the conductive plates 604, through the pest that has entered into the container 106, and to the other of the conductive plates 604, electrocuting the pest and causing the fuse 606 to blow (e.g., change from a closed position to an open position).

At 1018, the process may send a notification message (e.g., indicating that a pest was caught) to a computing device. For example, in FIG. 7, the trap 100 may send the notification 724 to one or more of the computing devices 728. The notification 724 may indicate that a pest was captured (and killed) in the trap 100.

At 1020, the process may determine that the container has been replaced with a new container, and the process may proceed to 1002. For example, the process may check the fuse 606 of FIG. 6 to determine whether the fuse 606 is blown. If the fuse 606 is intact (e.g., in a closed position), then the container 106 may be a new container. If the fuse 606 is blown (e.g., in an open position), then the container 106 may be one that contains a pest.

Figure 11:
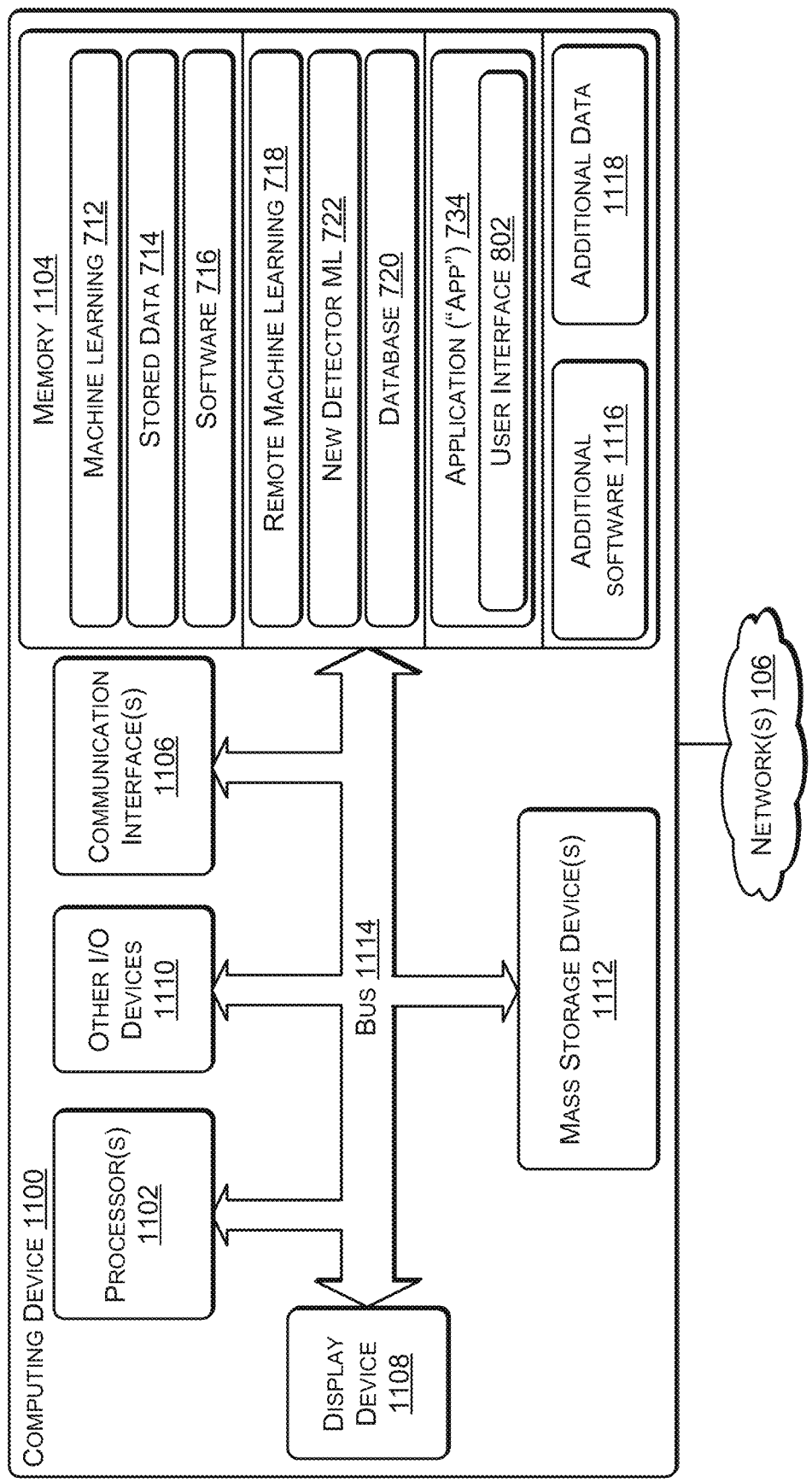
FIG. 11 illustrates an example configuration of a computing device that can be used to implement the systems and techniques described herein.

FIG. 11 illustrates an example configuration of the computing device 1100 that can be used to implement the systems and techniques described herein, including the trap 100, the server 702, and the computing devices 728. The computing device 1100 may include one or more processors 1102, a memory 1104, communication interfaces 1106, a display device 1108, other input/output (I/O) devices 1110, and one or more mass storage devices 1112, configured to communicate with each other, such as via system buses 1114 or other suitable connection. The system buses 1114 may include multiple buses, such as memory device buses, storage device buses, power buses, video signal buses, and the like. A single bus is illustrated in FIG. 11 purely for ease of understanding.

The processors 1102 are one or more hardware devices that may include a single processing unit or a number of processing units, all of which may include single or multiple computing units or multiple cores. The processors 1102 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processor 1102 may be configured to fetch and execute computer-readable instructions stored in the memory 1104, mass storage devices 1112, or other computer-readable media.

Memory 1104 and mass storage devices 1112 are examples of computer storage media (e.g., memory storage devices) for storing instructions that can be executed by the processor 1102 to perform the various functions described herein. For example, memory 1104 may include both volatile memory and non-volatile memory (e.g., RAM, ROM, or the like) devices. Further, mass storage devices 1112 may include hard disk drives, solid-state drives, removable media, including external and removable drives, memory cards, flash memory, floppy disks, optical disks (e.g., CD, DVD), a storage array, a network attached storage, a storage area network, or the like. Both memory 1104 and mass storage devices 1112 may be collectively referred to as memory or computer storage media herein, and may be a media capable of storing computer-readable, processor-executable program instructions as computer program code that can be executed by the processor 1102 as a particular machine configured for carrying out the operations and functions described in the implementations herein.

The computing device 1100 may also include one or more communication interfaces 1106 for exchanging data via the network 106. The communication interfaces 1106 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1106 can also provide communication with external storage (not shown), such as in a storage array, network attached storage, storage area network, or the like. A display device 1108, such as a monitor may be included in some implementations for displaying information and images to users. Other I/O devices 1110 may be devices that receive various inputs from a user and provide various outputs to the user, and may include a keyboard, a remote controller, a mouse, a printer, audio input/output devices, and so forth.

The computer storage media, such as memory 1104 and mass storage devices 1112, may be used to store software and data. For example, when the computing device 1100 is used to implement the trap 100, the memory 1104 may be used to store the machine learning 712, the stored data 714, and the software 716. When the computing device 1100 is used to implement the server 702, the memory 1104 may be used to store the remote machine learning 718, the new trap ML 722, and the database 720. When the computing device 1100 is used to implement one of the computing devices 728, the memory 1104 may be used to store the app 734 that is used to display the UI 802. In all three of the previous examples, the memory 1104 may be used to store additional software 1116 and additional data 1118. The additional software 1116 may include vision processing units (VPUs) to analyze image data captured by sensors and neural network processing. For example, neural networks may be used to analyze digital images and learn to identify images that include pests by analyzing example images that have been manually labeled as "<pest>" or "not a <pest>" and using the results to identify pests in other images. The neural networks automatically generate identifying characteristics from processing the learning material.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by one or more processors of a trap, sensor data from one or more sensors;
   determining, by the one or more processors, that the sensor data indicates a presence of a pest in the trap;
   causing, by the one or more processors, a shutter inside the trap to move from an approximately horizontal position to an approximately vertical position, thereby causing:
   a portion of a door of a container located inside the trap to come in contact with adhesive on an outer surface of the container to prevent the pest from leaving the container;
   providing, by the one or more processors, electricity to two conductive plates located on an inner bottom surface of the container, thereby causing the electricity to pass through the pest; and
   sending, by the one or more processors, a notification message over a wireless network to a computing device, the notification message indicating that the pest was captured in the container.

2. The method of claim 1, wherein the container is removed from the trap and replaced with a new container after the electricity passes through the pest.

3. The method of claim 1, wherein the trap includes a bait comprising a permeable membrane infused with a liquid attractant.

4. The method of claim 1, wherein:
   the container comprises treated paper, the treated paper comprising paper treated with a coating comprising wax or plastic.

5. The method of claim 1, wherein causing the shutter inside the trap to move from the approximately horizontal position to the approximately vertical position comprises:
   releasing a latch, causing a spring mechanism in a shutter hinge attached to the shutter to contract.

6. The method of claim 1, wherein causing the shutter inside the trap to move from the approximately horizontal position to the approximately vertical position comprises:
   providing the electricity to a motor located in a shutter hinge attached to the shutter, causing the motor to move the shutter at the shutter hinge.

7. The method of claim 1, wherein the one or more sensors comprise at least one of:
   a motion sensor, an imaging sensor, a microphone, a structured light sensor, an ultrasound sensor, a temperature sensor, an ultrasonic sensor, a capacitive sensor, or a micropower impulse radar sensor.

8. A trap comprising:
   one or more sensors;
   a first power rail and a second power rail located on an inner bottom surface of the trap and running along a width of the trap;
   a container placed inside the trap, the container including a first conductive plate and a second conductive plate located on an inner bottom surface of the container, the first conductive plate connected to a first contact running along an exterior width of the container, and the second conductive plate connected to a second contact running along the exterior width of the container;
   one or more processors; and
   one or more non-transitory computer readable media storing instructions executable by the one or more processors to perform operations comprising:
   receiving sensor data from an inward facing sensor of the one or more sensors;
   determining that the sensor data indicates a presence of a pest in the trap;
   causing a shutter inside the trap to move from an approximately horizontal position to an approximately vertical position, the shutter causing a portion of a door of the container to come in contact with adhesive on an outer surface of the container to prevent the pest from leaving the container;
   providing electricity to:
   the first power rail, wherein the first power rail is touching the first contact of the container that is connected to the first conductive plate; and
   the second power rail, wherein the second power rail is touching the second contact of the container that is connected to the second conductive plate;
   wherein the electricity passes from the first conductive plate through the pest to the second conductive plate; and
   sending a notification message over a wireless network to a computing device, the notification message indicating that the pest was captured in the container.

9. The trap of claim 8, further comprising:
   a bait comprising a permeable membrane infused with a liquid attractant.

10. The trap of claim 8, wherein:
    the container comprises treated paper, the treated paper comprising paper treated with a coating comprising wax or plastic.

11. The trap of claim 8, wherein causing the shutter inside the trap to move from the approximately horizontal position to the approximately vertical position comprises:
    releasing a latch, causing a spring mechanism in a shutter hinge attached to the shutter to contract.

12. The trap of claim 8, wherein causing the shutter inside the trap to move from the approximately horizontal position to the approximately vertical position comprises:
    providing the electricity to a motor located in a shutter hinge attached to the shutter, causing the motor to move the shutter at the shutter hinge.

13. The trap of claim 8, wherein the one or more sensors comprise at least one of:
    a motion sensor, an imaging sensor, a microphone, a structured light sensor, an ultrasound sensor, a temperature sensor, an ultrasonic sensor, a resistance sensor, a capacitive sensor, or a micropower impulse radar sensor.

14. A trap comprising:
    an inward facing sensor;
    a first power rail and a second power rail located on an inner bottom surface of the trap and running along a width of the trap;
    a container placed inside the trap, the container including a first conductive plate and a second conductive plate located on an inner bottom surface of the container, the first conductive plate connected to a first contact running along an exterior width of the container, and the second conductive plate connected to a second contact running along the exterior width of the container;
    one or more processors; and
    one or more non-transitory computer readable media storing instructions executable by the one or more processors to perform operations comprising:

receiving sensor data from the inward facing sensor;
determining that the sensor data indicates a presence of a pest in the trap;
causing a shutter inside the trap to move from an approximately horizontal position to an approximately vertical position, thereby causing a portion of a door of the container to come in contact with adhesive on an outer surface of the container to prevent the pest from leaving the container;
providing electricity to:
    the first power rail, wherein the first power rail is touching the first contact of the container that is connected to the first conductive plate; and
    the second power rail, wherein the second power rail is touching the second contact of the container that is connected to the second conductive plate;
    wherein the electricity passes from the first conductive plate through the pest to the second conductive plate; and
    sending a notification message over a wireless network to a computing device, the notification message indicating that the pest was captured in the container.

15. The trap of claim 14, wherein the container is removed from the trap and replaced with a new container after the electricity passes through the pest.

16. The trap of claim 14, wherein the trap includes a bait comprising a permeable membrane infused with a liquid attractant.

17. The trap of claim 14, wherein:
    the container comprises treated paper, the treated paper comprising paper treated with a coating comprising wax or plastic.

18. The trap of claim 14, wherein causing the shutter inside the trap to move from the approximately horizontal position to the approximately vertical position comprises:
    releasing a latch, causing a spring mechanism in a shutter hinge attached to the shutter to contract.

19. The trap of claim 14, wherein causing the shutter inside the trap to move from the approximately horizontal position to the approximately vertical position comprises:
    providing the electricity to a motor located in a shutter hinge attached to the shutter, causing the motor to move the shutter at the shutter hinge.

20. The trap of claim 14, further comprising at least one of:
    a motion sensor, an imaging sensor, a microphone, a structured light sensor, an ultrasound sensor, a temperature sensor, an ultrasonic sensor, a resistance sensor, a capacitive sensor, or a micropower impulse radar sensor.

* * * * *